(12) United States Patent
Mestezky

(10) Patent No.: US 11,509,353 B2
(45) Date of Patent: Nov. 22, 2022

(54) COMMUNICATION SYSTEMS AND METHODS OVER DIRECT CURRENT (DC) POWER CONDUCTORS TO REMOTE SUBUNITS

(71) Applicant: Corning Research & Development Corporation, Corning, NY (US)

(72) Inventor: Alexey Mestezky, Holon (IL)

(73) Assignee: Corning Research & Development Corporation, Corning, NY (US)

( * ) Notice: Subject to any disclaimer, the term of this patent is extended or adjusted under 35 U.S.C. 154(b) by 220 days.

(21) Appl. No.: 16/836,092

(22) Filed: Mar. 31, 2020

(65) Prior Publication Data
US 2021/0159941 A1 May 27, 2021

Related U.S. Application Data

(60) Provisional application No. 62/939,881, filed on Nov. 25, 2019.

(51) Int. Cl.
*H04B 10/80* (2013.01)
*H04B 3/54* (2006.01)
*H04B 10/2575* (2013.01)

(52) U.S. Cl.
CPC ....... *H04B 3/548* (2013.01); *H04B 10/25753* (2013.01); *H04B 10/808* (2013.01); *H04B 2203/547* (2013.01)

(58) Field of Classification Search
CPC ............. H04B 3/548; H04B 10/25753; H04B 10/808; H04B 2203/547
See application file for complete search history.

(56) References Cited

U.S. PATENT DOCUMENTS

| | | | | |
|---|---|---|---|---|
| 5,969,837 A | * | 10/1999 | Farber | H04W 88/085 398/118 |
| 7,203,851 B1 | * | 4/2007 | Lo | H04B 3/548 379/322 |
| 7,813,451 B2 | * | 10/2010 | Binder | H04B 7/15528 455/313 |

(Continued)

FOREIGN PATENT DOCUMENTS

WO 2012/064333 A1 5/2012

OTHER PUBLICATIONS

Salciunas; "Electronic Industries Association (EIA) RS-232-C Interface Standard"; Data Networking; (1991) 8 Pages.

(Continued)

*Primary Examiner* — Tanya T Motsinger
(74) *Attorney, Agent, or Firm* — C. Keith Montgomery

(57) ABSTRACT

Communication systems and methods over direct current (DC) power conductors to remote subunits may include interrupt windows in a power signal on a DC power conductor for safety reasons. The timing of rising and falling edges of the interrupt window may be modified, thereby changing the duration, period, or position within a period of the interrupt window. In effect, interrupt windows within the DC power signal may be pulse width modulated to send data between a power source and one or more subunits. Pulse width modulation (PWM) of the DC power signal preserves the safety features, but allows data and/or commands to be transferred between the power source and any subunits.

17 Claims, 17 Drawing Sheets

(56) References Cited

U.S. PATENT DOCUMENTS

| | | | | |
|---|---|---|---|---|
| 8,781,637 B2* | 7/2014 | Eaves | | H02J 3/12 |
| | | | | 700/286 |
| 8,897,215 B2 | 11/2014 | Shapira et al. | | |
| 9,026,036 B2 | 5/2015 | Saban et al. | | |
| 9,246,557 B2 | 1/2016 | Saban et al. | | |
| 10,658,837 B2 | 5/2020 | Hazani | | |
| 10,897,312 B2* | 1/2021 | Jiang | | H04B 10/1141 |
| 2006/0038661 A1* | 2/2006 | Reinhold | | H04B 3/548 |
| | | | | 375/259 |
| 2009/0039833 A1* | 2/2009 | Kitagawa | | H02J 7/00712 |
| | | | | 320/134 |
| 2010/0086064 A1* | 4/2010 | Jianming | | H04L 27/18 |
| | | | | 375/259 |
| 2010/0213759 A1* | 8/2010 | Covaro | | H04B 3/542 |
| | | | | 307/1 |
| 2010/0289343 A1* | 11/2010 | Covaro | | H05B 45/10 |
| | | | | 307/149 |
| 2015/0215001 A1* | 7/2015 | Eaves | | H04L 1/0033 |
| | | | | 375/257 |
| 2018/0289973 A1* | 10/2018 | Carney | | H04B 13/005 |
| 2019/0097457 A1* | 3/2019 | Hazani | | H02H 7/263 |
| 2020/0187031 A1* | 6/2020 | Kazmi | | H04W 36/0094 |
| 2021/0153314 A1* | 5/2021 | Ichikawa | | H05B 45/38 |
| 2021/0242703 A1* | 8/2021 | Hazani | | G05F 1/46 |
| 2021/0367642 A1* | 11/2021 | Roy | | H04L 47/821 |
| 2022/0026089 A1* | 1/2022 | Xie | | F24F 11/58 |

OTHER PUBLICATIONS

Singh et al., "DC Power-Line Communication Reference Design", Texas Instruments Incorporated, TIDU160—Oct. 2013, 47 pages.

* cited by examiner

COMMUNICATION SYSTEMS AND METHODS OVER DIRECT CURRENT (DC) POWER CONDUCTORS TO REMOTE SUBUNITS

CROSS-REFERENCE TO RELATED APPLICATIONS

This application claims the benefit of priority under 35 U.S.C. § 119 of U.S. Provisional Application No. 62/939,881 filed on Nov. 25, 2019, the content of which is relied upon and incorporated herein by reference in its entirety.

BACKGROUND

The disclosure relates generally to allowing communication from a central power source to remote subunits over power conductors used in a power distribution system. While a variety of environments are amenable to this communication, the power distribution system may be positioned in a distributed radio communication system (DCS) such as a distributed antenna systems (DAS) or a small cell radio access network for example.

The seemingly ubiquitous nature of power outlets leads many individuals to take the availability of electrical power for granted. Homes and offices routinely have an outlet on multiple, if not all, walls and/or floor. Likewise, overhead lighting is readily powered such that a simple flick of a switch turns on such overhead lighting. However, as anyone who has wired a building for power will tell you, there are many factors which must be considered when routing electrical conductors to carry power to outlets and overhead lighting.

While conventional power outlets are seemingly ubiquitous, there are many situations where it is inconvenient or inappropriate to use such power outlets to provide power to some device. As noted above, lighting may have power supplied directly thereto without having to use an intermediate outlet. Similarly, high-power devices may be hard wired to have power supplied directly. Distributed communication systems are one such situation and may require a power distribution network or power distribution system that has a centralized power source and one or more subunits that receive power from the centralized power source.

Some regulations, such as International Electric Code (IEC) 60950-21, may limit the amount of direct current (DC) that is remotely delivered by the power source to the remote subunits to less than the amount needed to power the subunits during peak power consumption periods for safety reasons, such as in the event a human contacts the wire. One solution to remote power distribution limitations is to employ multiple conductors and split current from the power source over the multiple conductors, such that the current on any one electrical conductor is below the regulated limit. Another solution includes delivering remote power at a higher voltage so that a lower current can be distributed at the same power level. For example, assume that 300 Watts (W) of power is to be supplied to a subunit by the power source. If the voltage of the power source is 60 Volts (V), the current will be 5 Amperes (A) (i.e., 300 W/60 V). However, if a 400 V power source is used, then the current flowing through the wires will be 0.75 A. However, delivering high voltage through electrical conductors may be further regulated to prevent an undesired current from flowing through a human in the event that a human contacts the electrical conductor. Likewise, there may be a need to prevent the line current from exceeding maximum allowed current values. Thus, these safety measures may require other protections, such as the use of protection conduits, which may make installations more difficult and add cost.

The problems of distributing power to radio communication circuits are not limited to communication systems. Lighting systems, smart homes with powered elements, Ethernet switches, water heating systems, server farms, call centers, or the like may all have distributed power systems and may encounter similar safety requirements. Given the existence of such power distribution networks, there may be instances where it is appropriate to communicate power control signals or the like from a source side of the power distribution network to subunits. Having a communication link separate and distinct from a power conductor may add unwanted complexity and/or provide challenges over longer distances. When placing data on the DC power conductors, data may be lost as large capacitors at the power source and the subunits may corrupt the data signal. Isolation of the capacitors to avoid such corruption typically requires large and expensive transformer coils. Even if such coils are used, power lines are inherently noisy which interferes with the data delivered over the power lines. Thus, improved communication techniques that use the power conductors are needed.

No admission is made that any reference cited herein constitutes prior art. Applicant expressly reserves the right to challenge the accuracy and pertinence of any cited documents.

SUMMARY

Exemplary aspects of communication systems and methods over direct current (DC) power conductors to remote subunits are disclosed. In particular, a power signal on a DC power conductor may include interrupt windows for safety reasons. The timing of rising and falling edges of the interrupt window may be modified, thereby changing the duration, period, or position within a period of the interrupt window. In effect, interrupt windows within the DC power signal may be pulse width modulated to send data between a power source and one or more subunits. Pulse width modulation (PWM) of the DC power signal preserves the safety features, but allows data and/or commands to be transferred between the power source and any subunits.

In this regard, in one exemplary aspect, a method for sending a communication signal from a power source to a remote subunit over DC power conductors is disclosed. The method comprises detecting an interrupt window created by a remote subunit. The method also comprises during the interrupt window opening a switch at a power source to decouple a DC power conductor from the power source. The method also comprises keeping the switch open past an end of the interrupt window to transmit data from the power source to the remote subunit.

An additional aspect of the disclosure relates to a method for sending a communication signal from a remote subunit to a power source in a power distribution network. The method comprises, at a remote unit in a power distribution network, opening a switch to disconnect a load from a power conductor to form an interrupt window according to a pulse repetition interval (PRI). The method also comprises sending data to a power source by modulating a period of the PRI.

An additional aspect of the disclosure relates to a power source. The power source comprises a power supply, an output port configured to be coupled to a power conductor, a switch positioned between the power supply and the output port, a current sensor associated with the power conductor, and a control circuit. The control circuit is configured to use the current sensor to detect an interrupt window on the power conductor created by a remote subunit. The control circuit is also configured to, during the interrupt window, open the switch to decouple the power conductor from the power supply. The control circuit is also configured to keep the switch open past an end of the interrupt window to transmit data from the power source to the remote subunit.

An additional aspect of the disclosure relates to a remote subunit. The remote subunit comprises a load, an input port configured to be coupled to a power conductor, a switch positioned between the load and the input port, and a control circuit. The control circuit is configured to open the switch to disconnect the load from the power conductor to form an interrupt window according to a PRI. The control circuit is also configured to send data to a power source by PWM a period of the PRI.

An additional aspect of the disclosure relates to a distributed communication system (DCS). The DCS comprises a central unit. The central unit is configured to distribute received one or more downlink communications signals over one or more downlink communications links to one or more remote subunits. The central unit is also configured to distribute received one or more uplink communications signals from the one or more remote subunits from one or more uplink communications links to one or more source communications outputs. The DCS also comprises a plurality of remote subunits. Each remote subunit among the plurality of remote subunits comprises a power input port configured to be coupled to a power conductor and receive a power signal from a power source therefrom. Each remote subunit also comprises a switch coupled to the power input port. Each remote subunit also comprises a first power output port configured to be coupled to a second power conductor to provide power from the remote subunit to a second cascaded remote subunit. Each remote subunit also comprises a controller circuit. The controller circuit is configured to use a current sensor to detect an interrupt window on the power conductor created by the remote subunit. The controller circuit is also configured to, during the interrupt window, open the switch to decouple the power conductor from the power supply. The remote subunit is configured to distribute the received one or more downlink communications signals received from the one or more downlink communications links to one or more client devices. The remote subunit is also configured to distribute the received one or more uplink communications signals from the one or more client devices to the one or more uplink communications links. The DCS also comprises a power distribution system. The power distribution system comprises one or more power distribution circuits. Each of the one or more power distribution circuits comprises a distribution power input configured to receive current distributed by the power source. Each of the one or more power distribution circuits also comprises a distribution power output configured to distribute the received current over a power conductor coupled to an assigned remote subunit among the plurality of remote subunits. Each of the one or more power distribution circuits also comprises a distribution switch circuit coupled between the distribution power input and the distribution power output, the distribution switch circuit comprising a distribution switch control input. Each of the one or more power distribution circuits also comprises a current measurement circuit coupled to the distribution power output and comprising a current measurement output. The current measurement circuit is configured to measure a current at the distribution power output and generate a current measurement on the current measurement output based on the measured current at the distribution power output. Each of the one or more power distribution circuits also comprises a controller circuit. The controller circuit comprises one or more current measurement inputs communicatively coupled to the one or more current measurement outputs of the one or more current measurement circuits of the one or more power distribution circuits. The controller circuit is configured to, for a power distribution circuit among the one or more power distribution circuits, generate a distribution power connection control signal indicating a distribution power connection mode to the distribution switch control input of the power distribution circuit indicating a distribution power connect state. The controller circuit is also configured to determine if the measured current on a current measurement input among the one or more current measurement inputs of the power distribution circuit exceeds a predefined threshold current level. The controller circuit is also configured to, in response to the measured current of the power distribution circuit exceeding the predefined threshold current level, communicate the distribution power connection control signal comprising the distribution power connection mode to the distribution switch control input of the power distribution circuit indicating a distribution power disconnect state.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Exemplary aspects of communication systems and methods over direct current (DC) power conductors to remote subunits are disclosed. In particular, a power signal on a (DC power conductor may include interrupt windows for safety reasons. The timing of rising and falling edges of the interrupt window may be modified, thereby changing the duration, period, or position within a period of the interrupt window. In effect, interrupt windows within the DC power signal may be pulse width modulated to send data between a power source and one or more subunits. Pulse width modulation (PWM) of the DC power signal preserves the safety features, but allows data and/or commands to be transferred between the power source and any subunits.

In particular, the modulation system disclosed herein allows operation over long, poor quality (e.g., high capacitance) power lines while being relatively immune to noise. The minor additional circuitry involved means that the total cost relative to a conventional power delivery network is comparable. The systems disclosed herein scale to multiple remote units and allow synchronization of simultaneous power transfer interrupt pulses between remote units connected to the same power line. While pulse width modulation is specifically contemplated, amplitude modulation may be added to increase bit transfer.

A power distribution system rarely exists in isolation. Rather, a power distribution system provides infrastructure to some other system, a few of which are briefly discussed with reference to FIGS. 1-3. A more detailed discussion of a power distribution system with safety features is provided with reference to FIG. 4, where the power signaling resulting from the safety features is provided with reference to FIG. 5. A discussion of exemplary aspects of the communication techniques begins below with the timing diagrams of FIG. 6 below.

Figure 1:
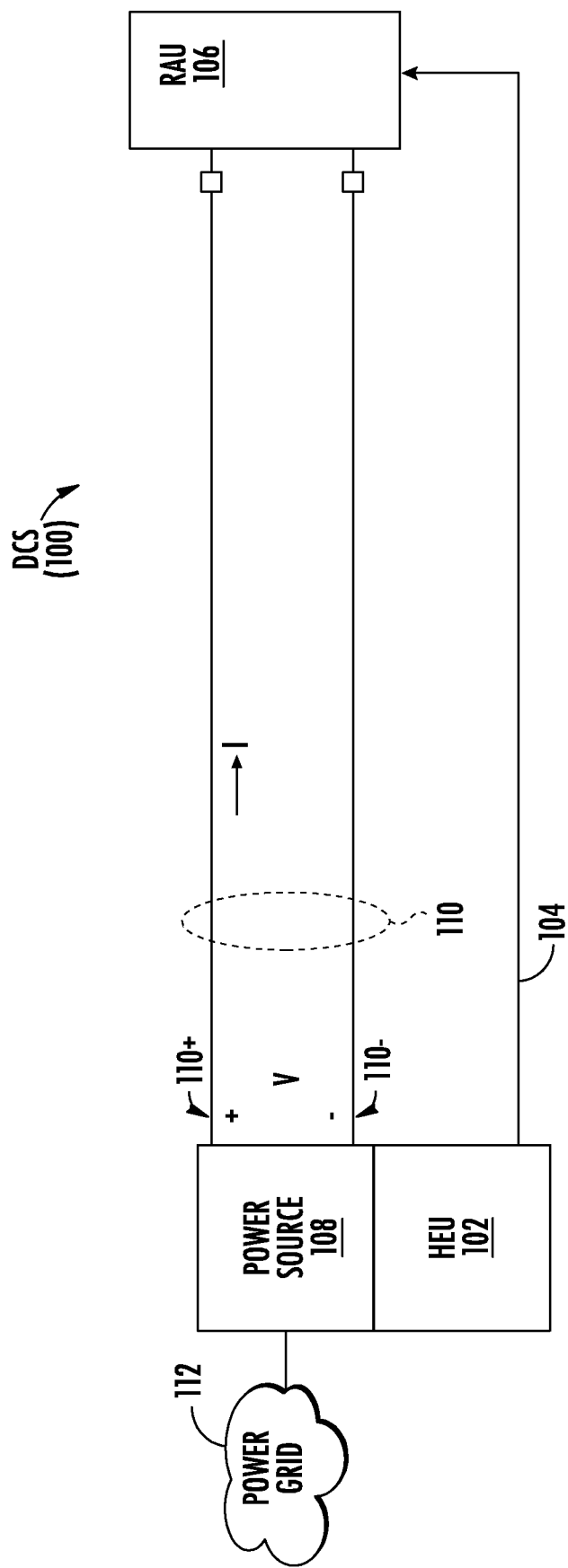
FIG. 1 is a schematic diagram of an exemplary distributed communication system (DCS) in the form of a distributed antenna system (DAS) illustrating a power source delivering power to a subunit that is a remote antenna unit (RAU)

In this regard, FIG. 1 illustrates a block diagram of a distributed communication system (DCS) 100. The DCS 100 may include a head end unit (HEU) 102 that communicates through a communication medium 104 with a remote antenna unit (RAU) 106. The communication medium 104 may be a wire-based or optical fiber medium. The RAU 106 includes a transceiver and an antenna (not illustrated) that communicate wirelessly with mobile terminals and other user equipment (also not illustrated). Because the RAU 106 sends and receives wireless signals and may potentially perform other functions, the RAU 106 consumes power. That power may, in some instances, be provided locally. More commonly, the RAU 106 receives power from a power source 108 that transmits power to the RAU 106 over power lines 110 formed from a positive power line 110+ and a negative power line 110−. The power lines 110 may be many meters long, for example, extending through an office building, across multiple floors of a multi-story building, or the like. Further, the power lines 110 may couple to multiple RAUs 106 (even though only one is illustrated in FIG. 1). The power source 108 may be coupled to an external power grid 112.

Figure 2:
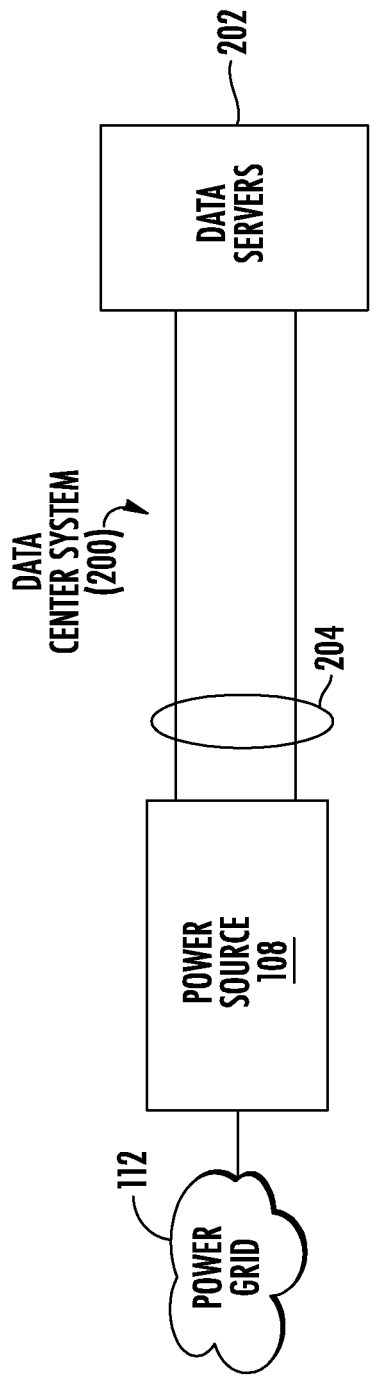
FIG. 2 is a schematic diagram of an exemplary data center illustrating a power source delivering power to a subunit that is a data server.

Similarly, FIG. 2 illustrates a data center system 200 having a power source 108 coupled to remote data servers 202 through power lines 204. The power source 108 is coupled to the external power grid 112. As with the RAU 106, the data servers 202 may consume power supplied through the power lines 204.

Figure 3:
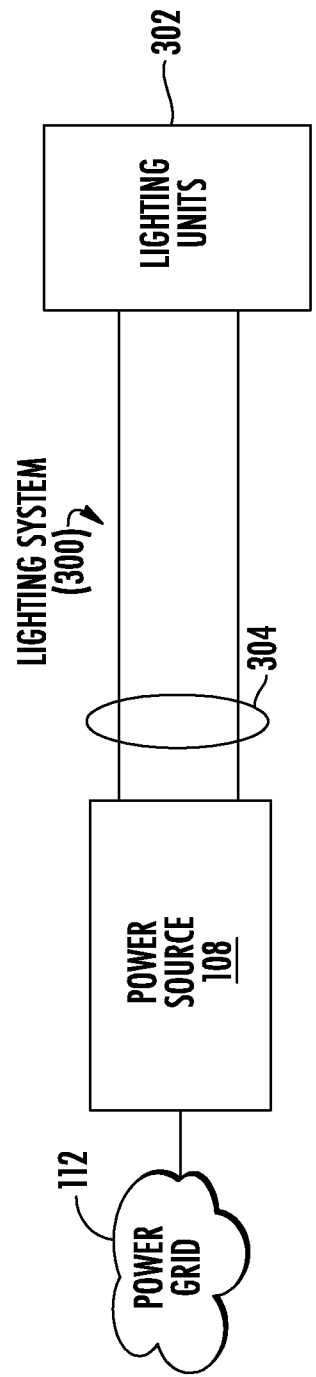
FIG. 3 is a schematic diagram of an exemplary distributed lighting system illustrating a power source delivering power to a subunit that is a remote lightning element.

Similarly, FIG. 3 illustrates a lighting system 300 having a power source 108 coupled to remote lighting units 302 through power lines 304. The power source 108 is coupled to the external power grid 112. As with the RAU 106, the remote lighting units 302 may consume power supplied through power lines 304.

It should be appreciated that there may be other contexts that may use a power distribution network and the examples provided in FIGS. 1-3 are not intended to be limiting. As a note of nomenclature, the RAU 106, the remote data servers 202, and the lighting units 302 are remote subunits.

The present disclosure provides a way for a power source to communicate commands to and receive responses from remote subunits in any of the systems described above. Before addressing exemplary aspects of the communication schemes of the present disclosure, a more detailed discussion of a power distribution network that is designed to provide power to a load in a remote subunit while having appropriate power safety elements is provided. Thus, the loads may be macrocells, remote units, RAUs, RANs, shared spectrum cells that use licensed or unlicensed bandwidth, small cell radio nodes, head end units, remote radio units, remote radio heads, cameras, lighting elements, or other electrical power consuming devices.

Figure 4:
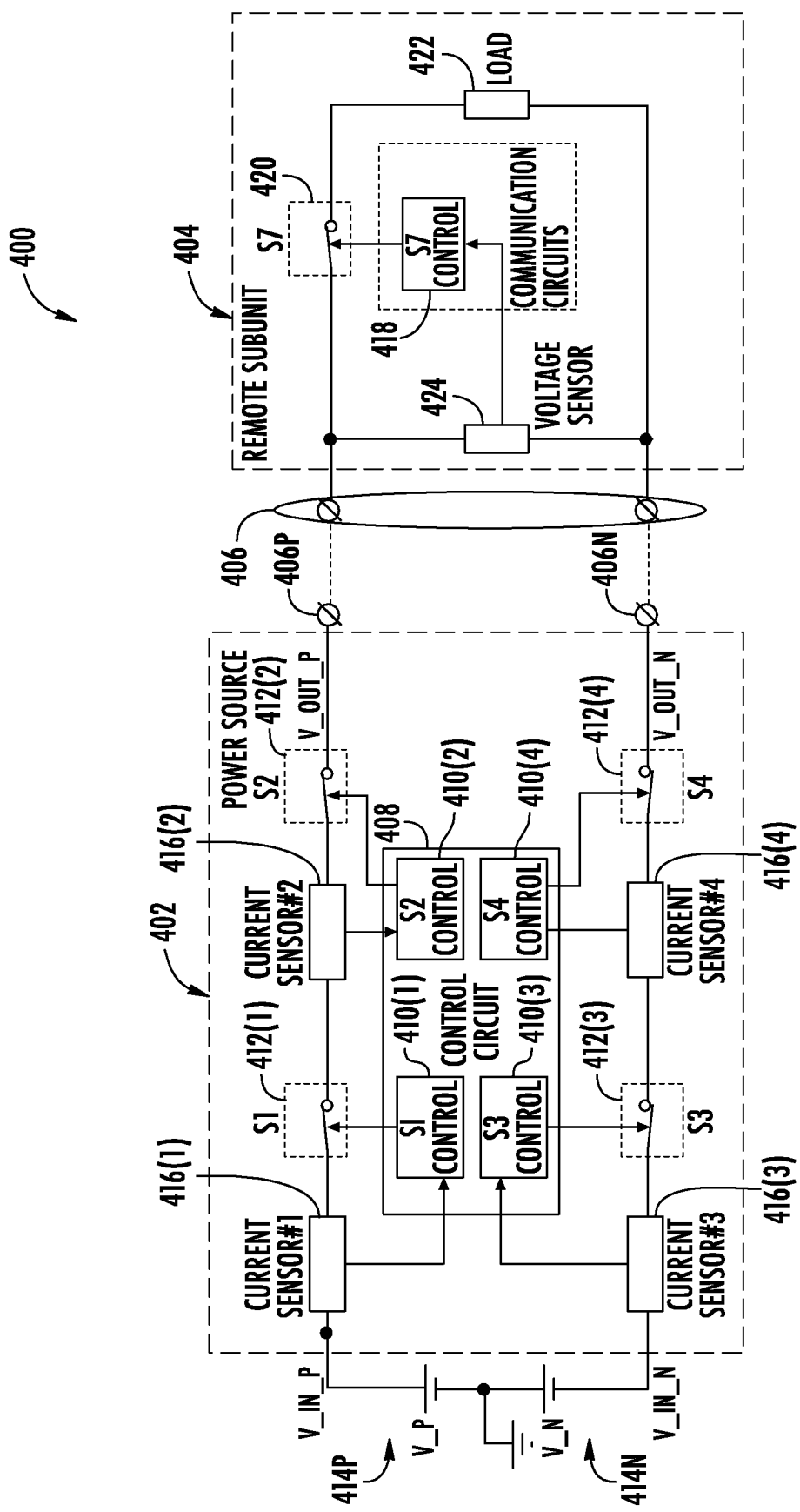
FIG. 4 is a high level block diagram of a power distribution system embedded in a communication system, wherein the power distribution system includes a power source and a remote subunit that may communicate using exemplary aspects of the present disclosure.
Figure 5:
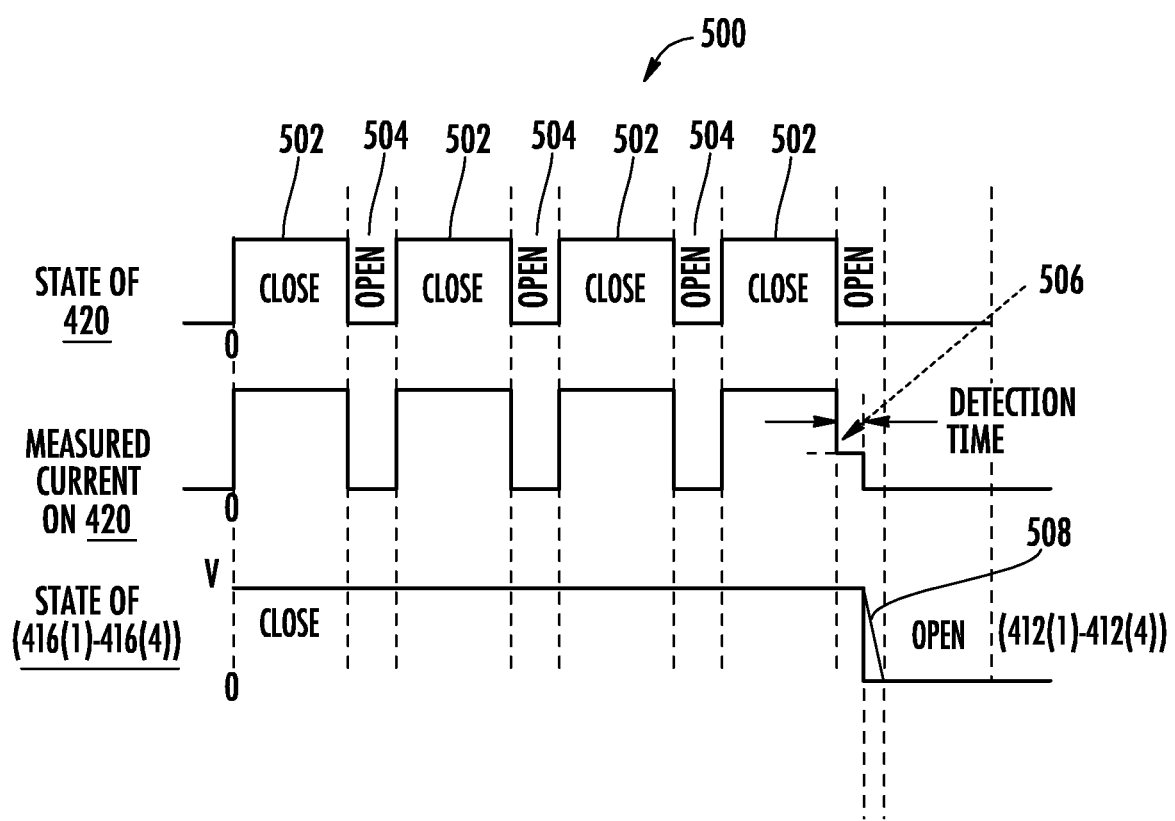
FIG. 5 is a timing diagram of line voltage, current levels, and switch position during normal operation of a power distribution network in the absence of the present disclosure.

In this regard, FIG. 4 provides a block diagram of a power distribution system 400 capable of effectuating communication between a power source 402 and a remote subunit 404. In particular, exemplary aspects of the present disclosure contemplate modulating pulses created by safety features of the power distribution system 400. The power source 402 is coupled to the remote subunit 404 through power conductors 406. The power conductors 406 may include a positive power conductor 406P and a negative power conductor 406N. The power source 402 may include a control circuit 408 with optional sub circuits 410(1)-410(4) configured to control switches 412(1)-412(4) that connect power supplies 414P and 414N to the power conductors 406P and 406N, respectively. Current sensors 416(1)-416(4) may be provided in the power source 402. The current sensors 416(1)-416(4) may be used to detect unsafe operating conditions and/or be used to perform edge detection in exemplary aspects of the present disclosure.

With continued reference to FIG. 4, the remote subunit 404 may include a control circuit 418 that controls a switch 420. The switch 420 may decouple a load 422 from the power conductors 406. A voltage sensor 424 may be provided that monitors the voltage levels on the power conductors 406 and reports the same to the control circuit 418.

In operation, the remote subunit 404 opens and closes the switch 420 to decouple the load 422 periodically, thereby interrupting current supplied to the load 422 while leaving the voltage on the power conductors 406 high. A timing diagram 500 is provided in FIG. 5 that illustrates operating of the switch 420 and the corresponding changes in current measured on the power conductors 406. Opening and closing of the switch 420 creates power transfer windows 502 (sometimes referred to as a power transfer period) and power interrupt windows 504 (sometimes referred to as a power interrupt period). Collectively a single power transfer window 502 and an adjacent power interrupt window 504 have a period that is termed herein a "pulse repetition interval" or "PRI." The power source 402 may monitor current on the power conductors 406 with the current sensors 416(1)-416(4) to make sure that the power interrupt windows 504 occur. If current is detected during a power interrupt window 504 (e.g., at 506 in FIG. 5), the control circuit 408 may infer that an external load such as a human is touching the power conductor(s) 406 creating an unsafe situation. Accordingly, the control circuit 408 may open one or more of the switches 412(1)-412(4) to lower the voltage on the power conductors 406 as shown at 508 in FIG. 5.

As different remote subunits 404 may have minor differences in the rate with which the switch 420 is activated by the control circuit 418, the power source 402 may initially synchronize to the timing generated by the remote subunit 404. A synchronization process may run in the background and may halt only during data transfers. In essence, the synchronization process allows the power source 402 to learn the switching rate of the remote unit 404 and "know" when to expect a power interrupt window 504 by the remote subunit 404.

As will be explained in greater detail beginning with reference to FIG. 6, exemplary aspects of the present disclosure modify the timing of rising edges of the power interrupt windows 502 as well as the length of the PRI to send data and/or commands between the power source 402 and the remote subunit 404. Further note that in an exemplary aspect, all communication begins at the power source 402 with replies as needed from the remote unit 404. Additional security and validation may be provided through cyclic redundancy check (CRC) and/or watch dog timers that terminate processes if not completed within an expected time frame.

In the abstract, the rising edges and the falling edges of the power interrupt windows may be modified to encode a logical one or zero. However, most power distribution systems are noisy, and thus, detection of changes in the falling edge of the power interrupt window may be challenging. However, empirical testing shows that detection of changes to the rising edge is more readily accomplished. Thus, exemplary aspects of the present disclosure specifically contemplate modification of the timing of the rising edge of the power interrupt window to encode data or commands. However, given that there may be two-way communication, limiting modification to the rising edge precludes one side from sending. That is, if both the power source 402 and the remote subunit 404 simultaneously try to modify the rising edge, the signal may be lost. While it may be possible to timeshare the rising edge (e.g., alternate use of the rising edges between the power source 402 and the remote subunit 404), there are other alternate solutions. Accordingly, exemplary aspects of the present disclosure contemplate that the power source 402 may encode on the rising edge of the power interrupt window, and the remote subunit 404 may encode by changing the period of the PRI to effectuate signaling between the power source 402 and one or more remote subunits 404.

Figure 6:
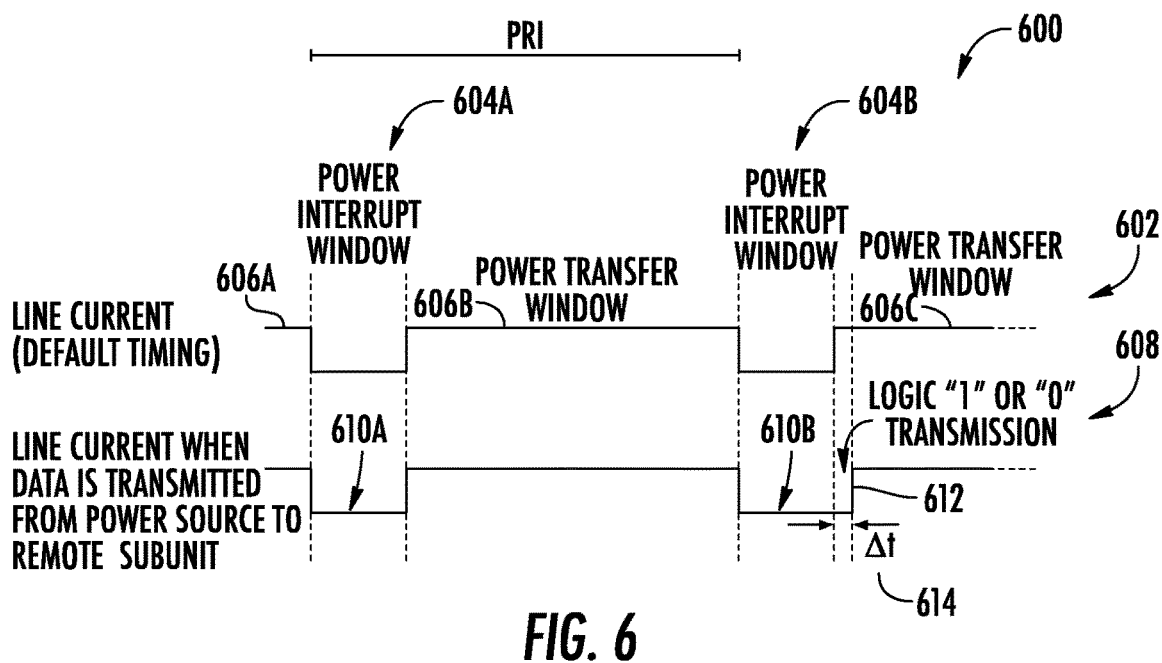
FIG. 6 is a timing diagram showing how the power source may modulate current levels to send data and/or commands to the remote subunit according to exemplary aspects of the present disclosure.

In this regard, FIG. 6 provides a timing diagram 600 of a current under normal conditions and a current when the power source 402 is transmitting a command or data to the remote subunit 404 on the rising edge of the power interrupt window. Specifically, the default timing of the power interrupt windows on the power conductor 406 is shown by line 602, where power interrupt windows 604A, 604B occur between power transfer windows 606A, 606B, 606C. In the default timing of line 602, the power interrupt windows 604A, 604B are the result of the switch 420 in the remote subunit 404 opening and closing as previously explained. The current on the power conductors 406 when the power source 402 is transmitting a command or data to the remote subunit 404 is shown by line 608. The first power interrupt window 610A is the same as the default power interrupt window 604A, where no information is being sent, but the second interrupt window 610B has had a rising edge 612 changed from its normal time by Δt 614. The width of Δt 614 may be programmed to be a logical "0" or logical "1" or more bits as needed or desired. The timing of the rising edge 612 is controlled by one of the switches 412(1) or 412(2) if the line is the power conductor 406P and one of the switches 412(3) or 412(4) if the line is the power conductor 406N. That is, normally the switch 420 decouples the load 422 from the power conductors 406 and then recouples the load 422 to the power conductors 406 to form the power interrupt window 604A, 604B. However, if one of the switches 412(1)-412(4) is also opened during the interrupt window 404A, 404B, there will be no current on the power conductors 406 and the power interrupt window 604A, 604B is extended by $\Delta t$ 614. Thus, the length of the power interrupt window 604A, 604B may be varied and the variation may encode data therein. Note that different values of $\Delta t$ may be used to encode different bits. For example, $\Delta t=50$ microseconds (μs) may be 00, $\Delta t=100$ μs=01, $\Delta t=150$ μs=10, and $\Delta t=200$ μs=11. Other encoding may also be used.

Figure 7:
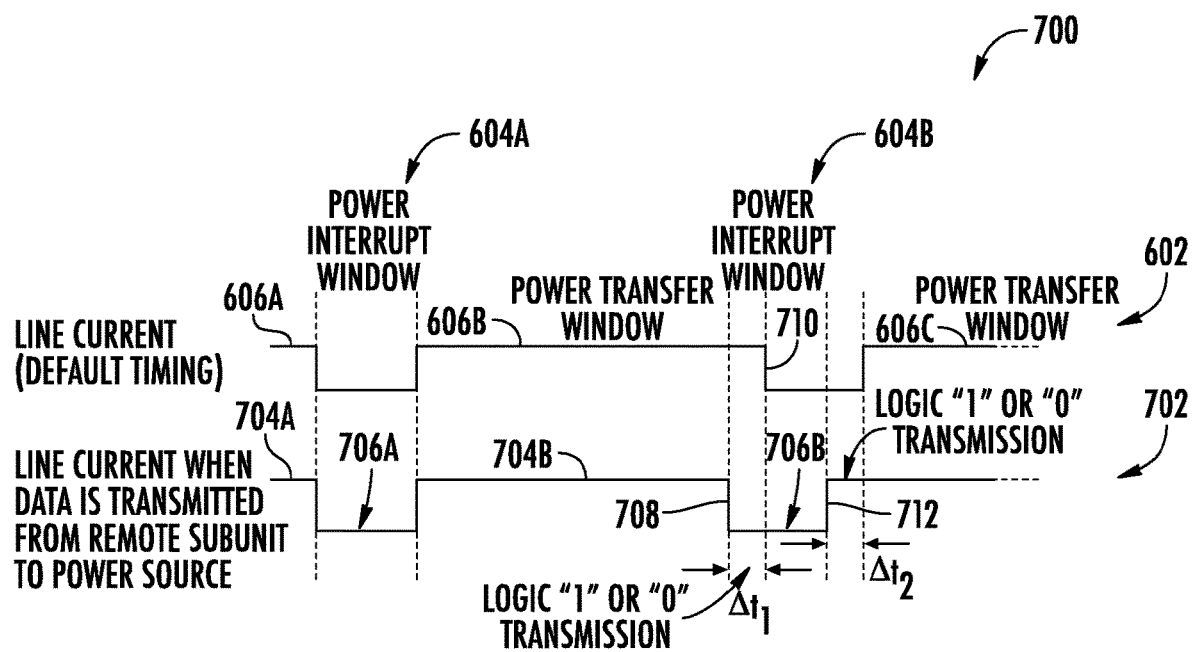
FIG. 7 is a timing diagram showing how the remote subunit may modulate current levels to send data to the power source according to at least one exemplary aspect of the present disclosure.

Similarly, FIG. 7 provides a timing diagram 700 of current under normal conditions (e.g., line 602), and current when the remote subunit 404 is transmitting data to the power source 402. As illustrated, the remote subunit 404 may use the falling edge or the rising edge to encode bits. In contrast to the first line 602, line 702 has a normal power transfer window 704A and a normal power interrupt window 706A, but the second power transfer window 704B has been shortened by $\Delta t_1$. Thus, the control circuit 408 may use one or more current sensors 416(1)-416(4) to detect a current on the power conductors 406 and detect the falling edge 708 caused by the early decoupling of the load 422 from the power conductors 406. The amount $\Delta t_1$ by which the falling edge 708 is ahead of the normal position of the falling edge (e.g., 710) may be varied and thus may encode data therein. Note that different values of $\Delta t$ may be used to encode different bits. For example, $\Delta t=50$ μs may be 00, $\Delta t=100$ μs=01, $\Delta t=150$ μs=10, and $\Delta t=200$ μs=11. Other encoding may also be used.

As mentioned above, the falling edge (e.g., 708) of a power interrupt window 706A, 706B may not be stable in time because of noise on the line or other factors. Accordingly, the rising edge 712 of the interrupt window 706B may also be moved forward an amount $\Delta t_2$ by recoupling the load 422 to the power conductors 406 by closing the switch 420 earlier than would normally occur in the default situation. This early closing of the switch 420 may be used regardless of whether the falling edge 708 was moved. Thus, the length of the interrupt window 706A, 706B may be varied and thus may encode data therein. As noted above, using the rising edge 712 to encode data may require time sharing with the power source 402 as the power source 402 may also use the rising edge 612 to encode data as explained above with reference to FIG. 6. One way in which time sharing may be achieved is a half-duplex system where the power source 402 initiates a command and the remote subunit 404 responds. The power source 402 always knows when it should be expecting a response and may refrain from sending a new command. Any response may occur within a predefined time window. If no response is received, the power source 402 may repeat the command or take other action as needed or desired.

Another non-mutually exclusive option is to modulate different sides of the rising edge in different manners. For example, to the left of the rising edge is the purview of the remote subunit 404 and to the right is the purview of the power source 402. Other techniques may be used as well.

Instead of both power source 402 and remote subunit 404 using the rising edge, the remote subunit 404 may modulate the PRI by some value $\Delta t$. That is, the power source 402 may use the rising edge to send data to the remote subunit 404, and the remote subunit 404 may send data to the power source 402 by modulating the PRI. This option is discussed in greater detail below with reference to FIG. 9.

Figure 8:
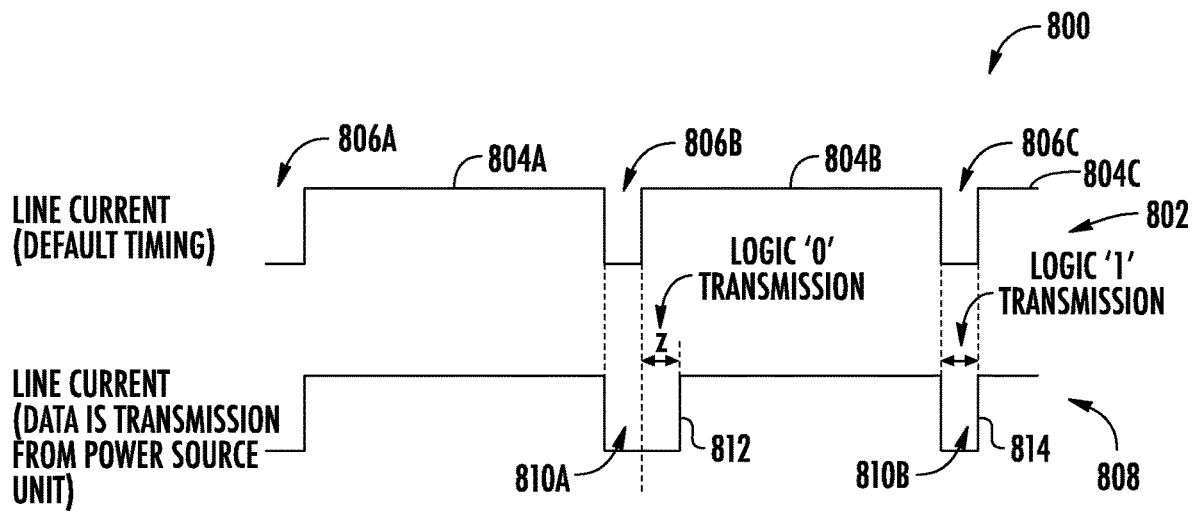
FIG. 8 is a timing diagram illustrating an encoding system for power source transmissions to remote units.

Instead of modulating a different position for the rising edge by different amounts to encode different values, the mere presence or absence of a modulation factor on the rising edge may be the encoding. Thus, as illustrated in FIG. 8, the power source 402 may encode a logical "0" by modulating the rising edge and encode a logical "1" by not modifying the rising edge. Specifically, FIG. 8 illustrates a timing diagram 800 where first line 802 shows the current using a default timing (analogous to line 602 in FIGS. 6 and 7), non-modulated signal with power transfer times 804A, 804B, 804C and interrupt windows 806A, 806B, 806C. In contrast, second line 808 has a first interrupt window 810A that has had a rising edge 812 modulated by a time "z", which encodes a logical "0" compared to the second interrupt window 810B, which has not modified the rising edge 814 and thus encodes a logical "1". It should be appreciated that the encoding can be reversed (e.g., no modification is a logical "0" and a modification is a logical "1"). Given the half-duplex nature, the remote subunit 404 may also merely change the position of the rising edge to encode data.

Figure 9:
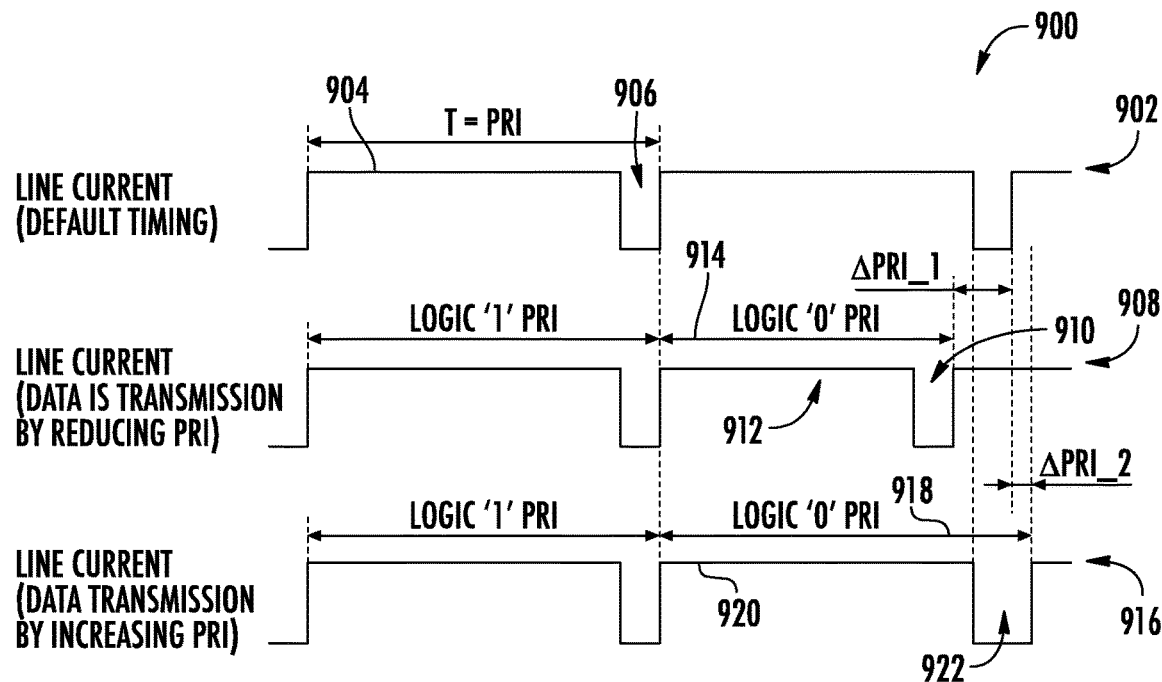
FIG. 9 is a timing diagram illustrating two possible encoding systems for remote unit transmissions to the power source.

FIG. 9 shows modulation of the PRI and also shows how the absence of modulation on the PRI may be effective encoding. Thus, FIG. 9 shows a timing diagram 900 that shows a first line 902 (analogous to line 602 in FIGS. 6 and 7) reflecting a default current on a power conductor 406. The default current has a period from rising edge to rising edge of PRI defined as the sum of the time for a power transfer window 904 and a power interrupt window 906. As noted above, the power interrupt window 906 is created when the remote subunit 404 opens a switch (e.g., switch 420) and decouples the load (e.g., 422) from the power conductor (e.g., 406) such that no current flows on the power conductor 406 (unless there is an external load such as a human). There are at least two ways that the remote subunit 404 may modulate the PRI. Specifically, the remote subunit 404 may shorten the PRI as illustrated in the second line 908. The power interrupt window 910 is still the same time as the power interrupt window 906, but the power transfer window 912 is temporally shorter than the power transfer window 904 by a value $\Delta PRI\_1$. While illustrated as having the default PRI length be a logical "1", and the shorter PRI length 914 be a logical "0", these may be reversed. Alternatively, the interrupt window may be extended to encode a value. Thus, as illustrated in third line 916, the logical "1" is provided by a default length PRI, but a logical "0" is provided by an extended PRI 918, where the power transfer window 920 is the same length as the power transfer window 904, but the power interrupt window 922 is extended by holding the switch 420 at the remote subunit 404 open longer by a value of $\Delta PRI\_2$. Again, the assignment of a logical "1" and "0" may be reversed.

Figure 10:
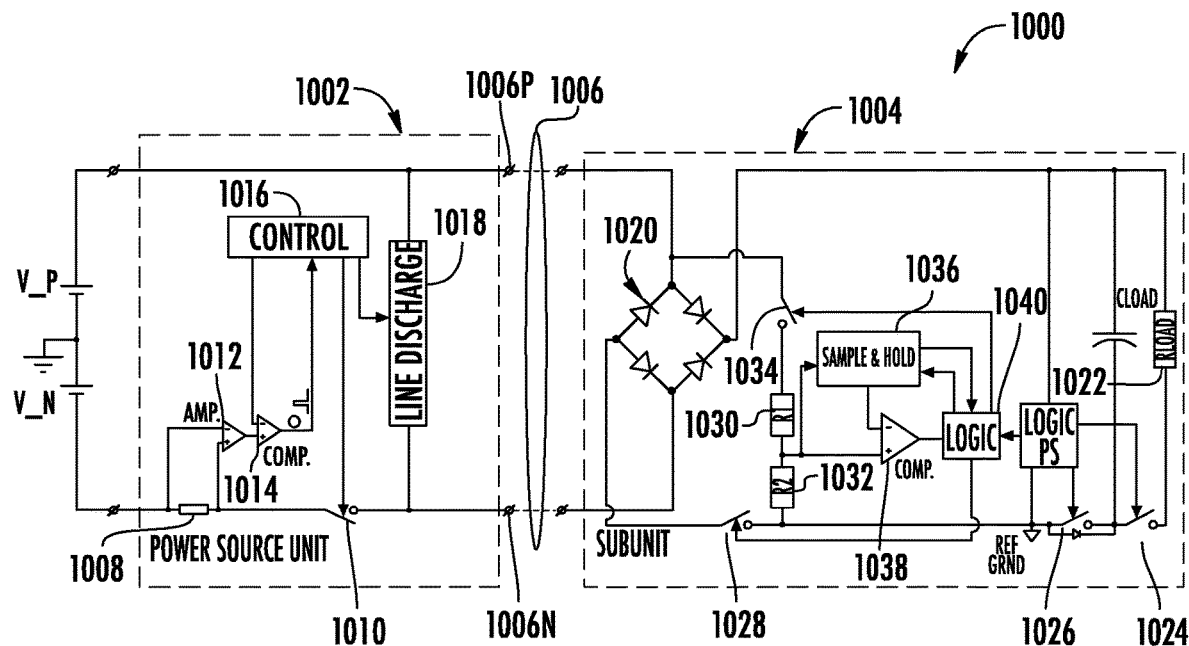
FIG. 10 is a schematic diagram of elements in the communication system portion of a power distribution system that enables two-way communication between the power source and the remote unit.

A more detailed electrical diagram of a communication capable power distribution system having a power source and remote subunit is provided in FIG. 10 where a power distribution system 1000 is illustrated. In particular, the power distribution system 1000 includes a power source 1002 (analogous to power source 402) and a remote subunit 1004 (analogous to remote subunit 404). The power source 1002 is connected to the remote subunit 1004 through power conductors 1006 such as a positive power conductor 1006P and a negative power conductor 1006N. The power source 1002 includes a current sense resistor 1008 and a switch 1010. The current across the current sense resistor 1008 is provided to a differential amplifier 1012, which provides an amplified current signal to a leakage comparator 1014. The leakage comparator 1014 also receives a threshold value from a control circuit 1016. When the amplified current signal does not exceed the threshold value at the leakage comparator 1014, a no leakage pulse is provided to the control circuit 1016. If the control circuit 1016 does not receive the no leakage pulse, an alarm may be generated and the switch 1010 may be opened. However, this same switch 1010 may be used to modulate the rising edge of an interrupt window as described above. A line discharge circuit 1018 may also be provided to take the charge off the power conductors 1006 when the switch 1010 is opened. This line discharge circuit 1018 may be activated only when there is leakage current detected or during any interrupt window as needed or desired. In the absence of a discharge, the power conductors 1006 will still be charged when the switch 1010 is open and the remote subunit 1004 reconnects with no existing load, and thus, positive voltage change will not appear on the power conductors 1006. The absence of the positive voltage change on reconnection may interfere with recognition of a signal from the power source 1002. Alternatively, a current sensor (not shown) may be included in the remote subunit 1004, but such arrangement may not be practical as it may be difficult to discriminate between current caused by a line discharge and current caused by the power source 1002.

With continued reference to FIG. 10, the remote subunit 1004 may include a diode bridge 1020 to protect against improper polarity and helps avoid discharge of a Cload capacitor. The remote subunit 1004 further has a load 1022, which is selectively coupled to the power conductors 1006 by a switch 1028. Switches 1024 and 1026 may be used to charge the Cload capacitor and operate as hot swap switches that prevent an excess current consumption from the power source 1002. A sample and hold circuit 1036 may be coupled to a comparator 1038 and a control circuit 1040. The comparator 1038 may measure if there is a voltage rise on the power conductors 1006 to see if the power source 1002 has modulated the rising edge of the interrupt window. Resistors 1030 (R1) and 1032 (R2) may be used to sense a line voltage when switch 1034 is closed.

Figure 11A:
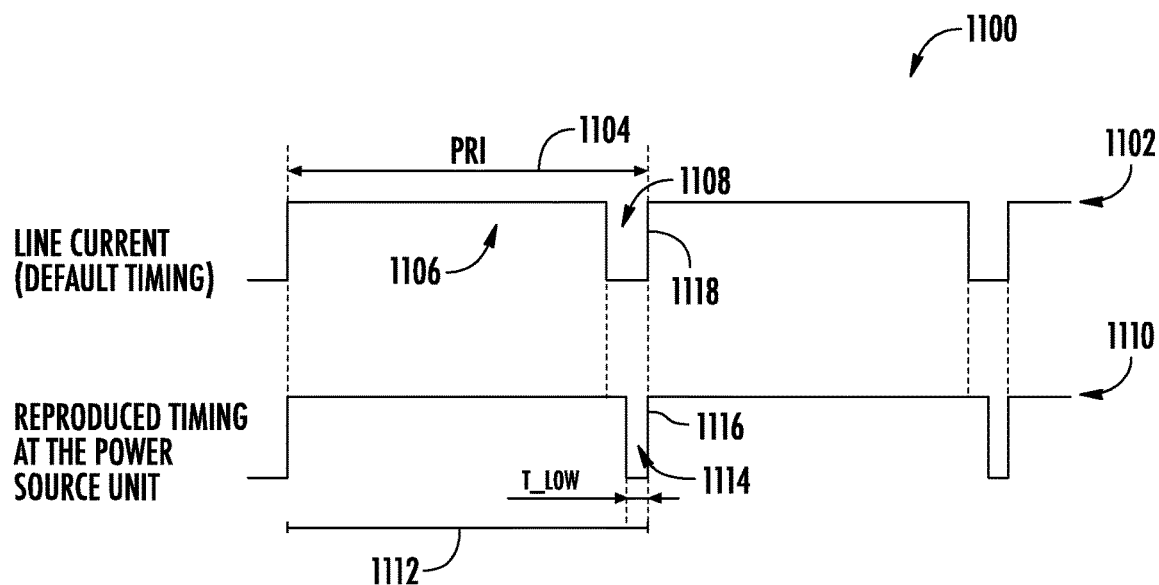
FIG. 11A is a timing diagram showing how the power source perceives the interrupt windows generated by the remote unit of a communication system.

FIG. 11A provides a timing diagram 1100 showing how the power source 1002 perceives the disconnect event from the remote subunit 1004 to assist in synchronization. The first line 1102 is the default timing line (analogous to line 602 in FIGS. 6 and 7). The first line 1102 shows the PRI 1104 having a power transfer window 1106 when the switches 1024, 1026, and 1028 are closed and power is provided to the load 1022. The PRI 1104 also has a power interrupt window 1108 when the load 1022 is disconnected from the power conductors 1006 by opening the switch 1028. The regular PRI 1104 provided in line 1102 may be used to synchronize the power source 1002 as needed or desired. Given capacitance in the power conductors 1006, transmission lag caused by the length of the power conductors 1006, or other factors, the power source 1002 may not see the full width of the power interrupt window 1114 as illustrated in second line 1110. The power source 1002 does detect a full PRI 1112, but there is stored energy in the inductance of the power conductors 1006 that should be removed after the remote subunit 1004 disconnects from the power conductors 1006, and as a result, the power interrupt window 1114 perceived by the power source 1002 is reduced. However, the rising edge 1116 in the second line 1110 and the rising edge 1118 in the first line 1102 are aligned with acceptable skew. To allow proper communication with a minimum bit error rate (BER), the power source 1002 should know the PRI 1104 of the remote subunit 1004 and be synchronized to the start of the power transfer window 1106 (e.g., the rising edges 1116 and 1118).

Figure 11B:
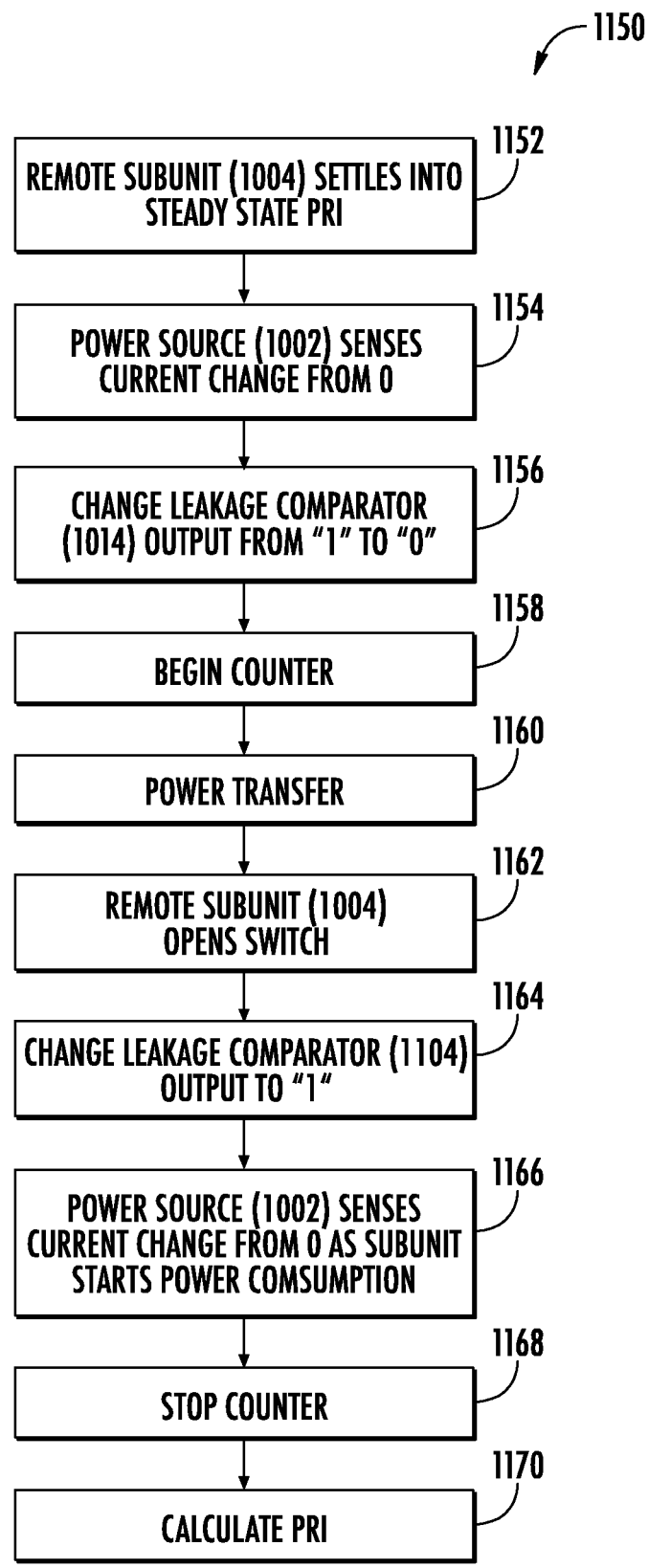
FIG. 11B is a flowchart showing how the power source calculates an initial pulse repetition interval (PRI) window based on the current changes caused by the remote unit decoupling the load from the power conductors.

FIG. 11B provides a process 1150 for synchronizing the power source 1002 to the remote subunit 1004. Specifically, the process 1150 begins with the remote subunit 1004 coupled to the power source 1002 and having settled into a steady state PRI (block 1152). The power source 1002 senses when current on the power conductors 1006 changes from 0 (i.e., when the remote subunit 1004 reconnects to the power conductors 1006 using the switch 1028) (block 1154). The power source 1002 changes the leakage comparator 1014 output from "1" to "0" (block 1156) responsive to the remote subunit 1004 reconnecting to the power conductors 1006 and causing current to flow again. The power source 1002 starts a counter (block 1158) within the control circuit 1016 and power is transferred to the remote subunit 1004 (block 1160). Subsequently, the remote subunit 1004 disconnects the load 1022 (block 1162), and the leakage comparator 1014 changes its output back to "1" (block 1164) after sensing no current on the line. The remote subunit 1004 reconnects to the power conductors 1006 and starts to consume power in a new power transfer cycle. The power source 1002 then senses the current change from 0 (block 1166) when the remote subunit 1004 reconnects to the power conductors 1006. When the current changes from 0 and the comparator output changes from "1" to "0", the power source 1002 stops the counter (block 1168) and calculates a PRI based on the counter (block 1170). There may be other synchronization processes used without departing from the present disclosure.

Figure 12:
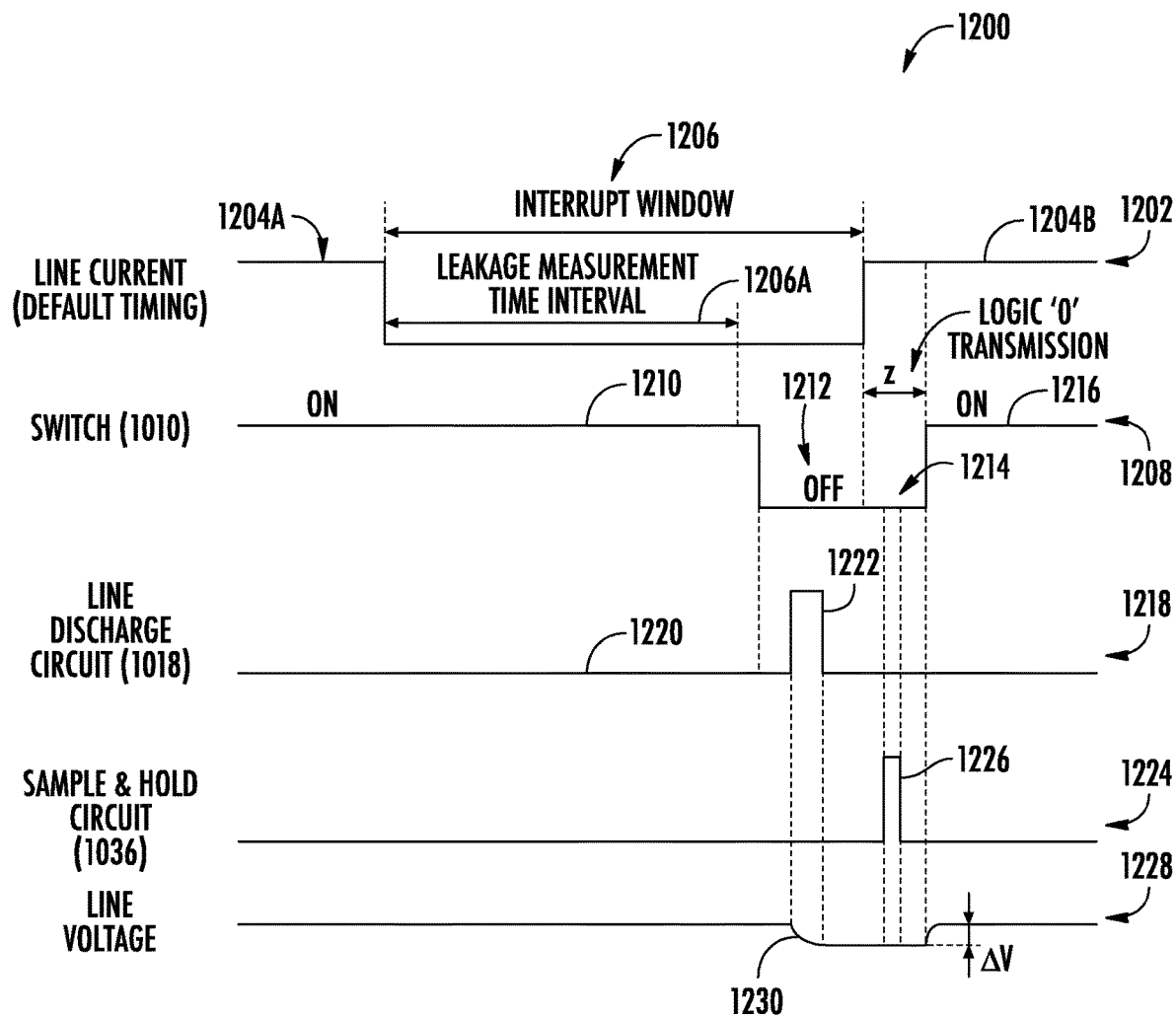
FIG. 12 is a timing diagram showing how a line discharge circuit may remove excess charge on a power conductor so that there is a voltage change in the line to allow detection of a trailing edge of an interrupt window.

FIG. 12 shows a timing diagram 1200 where the line discharge circuit 1018 is operating to discharge the power conductors 1006 so that the data transmission from the power source 1002 can be received. In particular, the first line 1202 shows the current with power transfer windows 1204A, 1204B and power interrupt window 1206. During the power interrupt window 1206, the power source 1002 measures leakage current. As noted, in general, the switch 1010 is closed so that voltage remains on the power conductors 1006 and leakage current can be detected during leakage measurement time interval 1206A. However, as discussed above, the switch 1010 may be opened to facilitate communication from the power source 1002 to the remote subunit 1004. Operation of the switch 1010 is shown in the second line 1208, where the switch 1010 is initially closed (on) as shown at 1210, but then opens (off) as shown at 1212 after the leakage measurement time interval (e.g., 1206A) is completed. By keeping the switch 1010 open after the remote subunit 1004 reconnects to the power conductors 1006, data is sent to the remote subunit 1004 (shown at 1214). Then the switch 1010 is closed (shown at 1216). Operation of the line discharge circuit 1018 is shown in third line 1218. The line discharge circuit 1018 is generally inactive (shown at 1220), but after the switch 1010 is opened and before (or during when) the remote subunit 1004 reconnects to the power conductors 1006, the line discharge circuit 1018 operates (shown at 1222). As a result, the power conductors' 1006 stored energy discharges and its voltage (1228) reduces (1230). As shown in the fourth line 1224, it is during the time after the remote subunit 1004 reconnects to the power conductors 1006 that the sample and hold circuit 1036 operates to detect the switch 1010 being open (shown at 1226). Specifically, before turning on the switch 1028, the switch 1034, the resistors 1030, 1032, and the sample and hold circuit 1036 are connected (see FIG. 13) to the power conductors 1006, the line voltage is sampled, and held in the sample and hold circuit 1036. The line voltage is shown at the fifth line 1228. As expected, the line voltage remains constant and high for most of the power interrupt window 1206. However, on activation of the line discharge circuit 1018, the line voltage sags (shown at 1230), which allows proper detection of the switch 1010 being open. The sampled voltage from the sample and hold circuit 1036 is compared to the current line voltage (ΔV on 1228). If during a predefined time period, the difference between the current line voltage and the sampled line voltage is higher than a predefined threshold, the control circuit 1040 decides that a signal (e.g., a logical "0") was received from the power source 1002. If the converse is true, the difference between the current line voltage and the sampled line voltage is lower than a predefined threshold, the control circuit 1040 decides that a signal (e.g., a logical "1") was received from the power source 1002.

Figure 13:
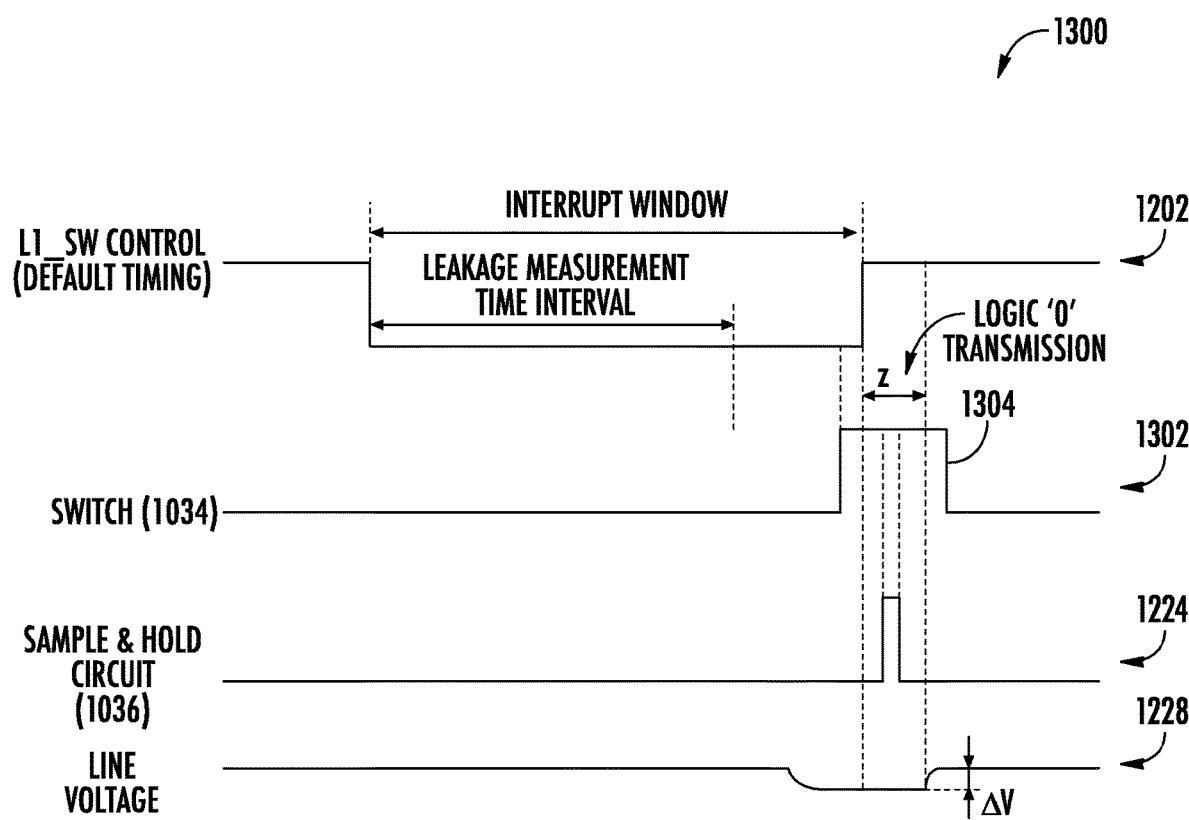
FIG. 13 is a timing diagram showing activity of a sample and hold circuit to detect the voltage change on the power conductor.

FIG. 13 illustrates a timing diagram 1300 with the activation of the switch 1034 relative to the sample and hold circuit 1036 highlighted. Specifically, the switch 1034 is illustrated in the second line 1302, where the switch 1034 is closed (on) at 1304 which includes the time at which the sample and hold circuit 1036 samples the voltage on the power conductors 1006.

As with any communication system, there may be noise or other factors which cause signal errors. Exemplary aspects of the present disclosure provide options for reducing such errors. For example, the power source 1002 should have a priori knowledge of the default PRI value, so when the power source 1002 measures a PRI different from an expected value at a time when the remote subunits 1004 are not expected to be modulating the PRI, the power source 1002 may ignore the measured PRI and initialize a new measurement process. It is expected that the primary source of such errors will be the dispersion of clock sources. Proper synchronization may correct such errors or eliminate accumulated drift.

A default power interrupt signal at the remote subunit 1004 and the reproduced synchronized signal may be generated with high frequency oscillators with an initial frequency accuracy of a few tenths of parts per million, so any misalignment between an original power interrupt signal and a reproduced one is minimized.

In case of operation under no load conditions, there may be no current gradients when the switch 1028 is turned on. In case of no current gradients being detected at the power source 1002, it will be difficult to generate a reproduced, synchronized signal at the power source 1002 and data transmitted from a remote subunit 1004 may not be able to be detected. To avoid this situation, an existing line termination formed from the resistors 1030 and 1032 at the remote subunit 1004 may be provided as a dummy load. Operation of the line termination is provided in timing diagram 1300, where the second line 1302 shows the opening of the switch 1034. Thus, the line termination may be connected to the power conductors 1006 for a short time before a start of the transfer period and will be disconnected after a delay that is equal to the maximum time that is defined for the data transfer plus some delta. This process insures a current gradient will appear each time the switch 1028 is turned on, regardless of the load 1022. The line termination may be disconnected (e.g., by opening switch 1034) from the power conductors 1006 a short time after the switch 1028 is turned on to reduce dissipated power and heat.

The line termination may keep the diode bridge 1020 in a reverse biased state until the line voltage is not greater than the Cload capacitor. This insures proper voltage gradient detection at the remote subunit 1004. A line termination control algorithm can be implemented by the control circuit 1040 of the remote subunit 1004. The control circuit 1040 will connect the line termination for the short time for n consequence power line cycles each predefined time period (every 1 second for example). This insures the power source 1002 synchronization in case there is a need to send a command or data. It should be appreciated that other algorithms based on sensing load current or the like can also be used.

During an interrupt window, and during an extended interrupt window having transferred data, the energy to the load 1022 will be supplied by the Cload capacitor. An amount of transferred data may be limited so that charge on the Cload capacitor does not fall below a predefined threshold.

It should be appreciated that there may be systems that employ power distribution networks that have a power source coupled to more than one remote subunit. An example is discussed below with reference to FIG. 15. Before discussing some of the hardware requirements for such point-to-multipoint systems, an overview of the signaling is provided in the timing diagram 1400 of FIG. 14. Initially note that when there are multiple remote subunits, there is a need that all remote subunits be disconnected from the power conductors at the same time. That is, so long as one remote subunit remains coupled to the power conductors, current will flow and the power source will not be able to perform a leakage current test to detect an external load. Or more accurately, a leakage current test while at least one remote subunit is coupled to the power conductors will always show a leakage current and always assume that there is an external load. Accordingly, exemplary aspects of the present disclosure contemplate that the remote subunits will synchronize their interrupt windows and have the same power cycle timing (i.e., they should have near identical PRIs). While precise synchronization is desired, minor variances may be tolerated although any drift will have to be corrected periodically by resynchronizing.

In an exemplary aspect, during power start up, each remote subunit 1004 may operate in a "start-up mode" with its own PRI and duty cycle. A PRI and duty cycle is chosen such that there is a 100% probability to get at least one interrupt pulse that is equal or longer than the default power interrupt period (e.g., 0.5 ms). The repetition period of the total power interrupt pulse will be equal to or less than the default PRI (e.g., 4 ms). Parameters of start-up timing signals of each remote subunit 1004 can be calculated. This start-up PRI and the duty cycle may be sufficient to charge the Cload capacitor and supply an energy needed to the control circuit 1040. Under these conditions, there should be no false leakage detection.

In the event that multiple remote subunits 1004 are connected to a power conductor already active, to avoid a false leakage alarm, the newly connected remote subunit 1004 will start to operate with an on time significantly lower than a default power interrupt window (e.g., 604A), which should not cause a false leakage detection by the power source 1002, even under worst case conditions. The final interrupt window (after connection of the additional remote subunit) will still be sufficient to allow leakage detection by the power source 1002 and still not cause a false alarm.

Each remote subunit 1004 may operate in the start-up mode until its respective Cload capacitor is charged to a predefined threshold voltage (which may be approximated by a predefined time). During start up, the load 1022 will be disconnected by the switch 1028.

Figure 14:
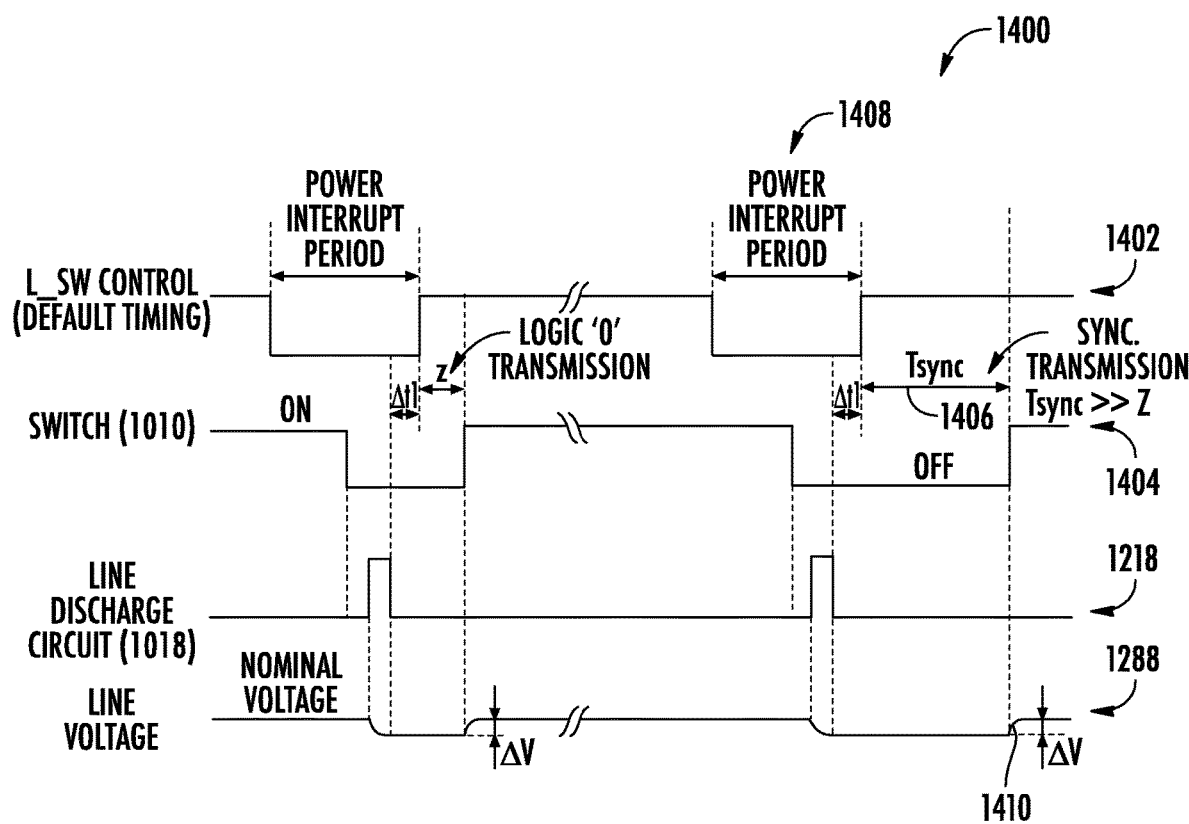
FIG. 14 is a timing diagram showing how synchronization may be achieved once the power source has a desired PRI from remote units.

During the start-up period, the power source 1002 may send a synchronization pulse by disconnecting the power conductors 1006 with the switch 1010. Such synchronization pulse is illustrated in FIG. 14 in the first line 1402 and second line 1404 as Tsync 1406. Specifically, the switch 1010 is held open after the power interrupt period 1408. The remote subunits 1004 see no current (or equivalently sense through a voltage measurement) on the line for a predefined synchronization time Tsync and then see the voltage rising at 1410 when the switch 1010 is closed. The remote subunits 1004 may then reset the timing of their interrupt windows based on this synchronization marker from the power source 1002. Given that the PRI and default power interrupt window should be defined a priori, the remote subunits 1004 should now be synchronized. Other techniques such as using a phase locked loop (PLL) may also be used to implement a synchronization circuit as is well understood.

For example, it is assumed that the interrupt window is defined to be 0.5 ms and a maximum communication data from the power source 1002 can extend the interrupt window for a maximum of 0.2 ms. Under this set of assumptions, the line drop by the power source 1002 will be 0.2 ms+$\Delta t1$ (shown in FIG. 14). The synchronization pulse Tsync 1406 width can be chosen wide enough so that even after some ringing or noise on the line voltage due to disconnection, the effective line voltage pulse width, with reduced amplitude, will be significantly wider than any other pulse and can be readily detected by the remote subunits 1004. After detecting one or more synchronization pulses, the remote subunit 1004 will synchronize thereto.

In particular, the remote subunit 1004 may detect the synchronization pulse by detection of a line voltage pulse with an amplitude lower than a predefined voltage value, with a known repetition rate and known, unique pulse width. A line voltage drop may be detected using a comparator with a constant reference value. Line voltage drop may be controlled by the amplitude of the discharge current resulting from operation of the line discharge circuit 1018 and duration of the line discharge pulse. In case of no-synchronization, an adaptive algorithm to find a best discharge pulse duration and amplitude can be implemented.

Once synchronized, the power source 1002 may address the remote subunits 1004 using any conventional addressing technique such as by factory assignment, enumeration, or the like. Once addressed, the addressed remote subunit 1004 will respond to the command sent. Likewise, the other remote subunits 1004 (not addressed by the command) may avoid closing the switch 1028 for a predetermined amount of time to avoid corruption of a data transmission from the remote subunit 1004 to the power source 1002. Data collisions can be avoided using the increased PRI process shown by line 916 in FIG. 9. For example, while one remote subunit 1004 transmits data to the power source 1002, all other remote subunits 1004 transmit a logical "0" as shown by line 916 in FIG. 9. The length of the answer to each command is defined at all the remote subunits 1004, so all remote subunits 1004 will know the number of power cycles to transmit the "0" to avoid data corruption.

Note that any of the referenced inputs herein can be provided as input ports or circuits, and any of the referenced outputs herein can be provided as output ports or circuits.

Figure 19:
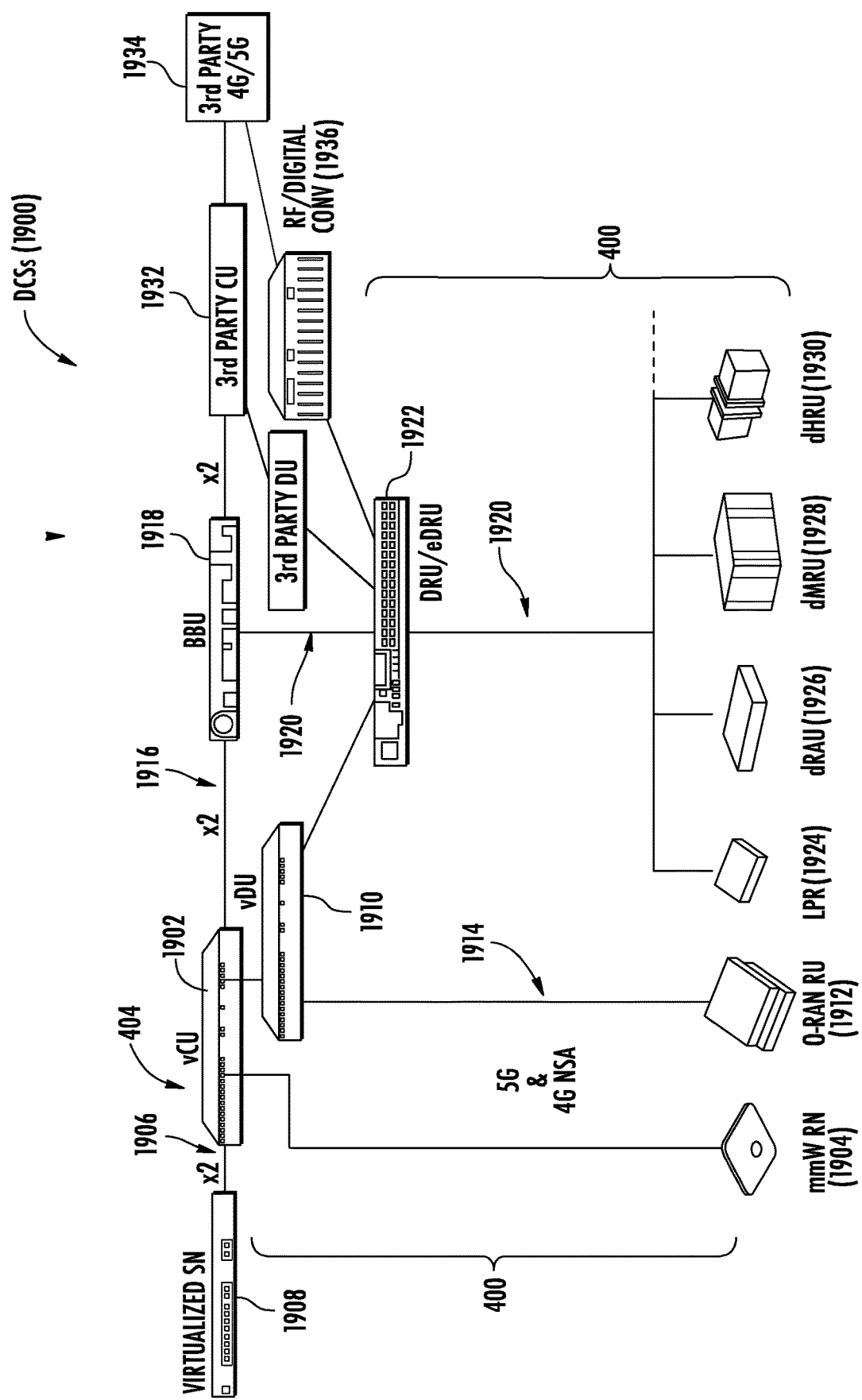
FIG. 19 is a schematic diagram an exemplary DCS that supports 4G and 5G communications services, and that can include one or more power distribution systems, including the power distribution systems in FIGS. 1 and 4.
Figure 20:
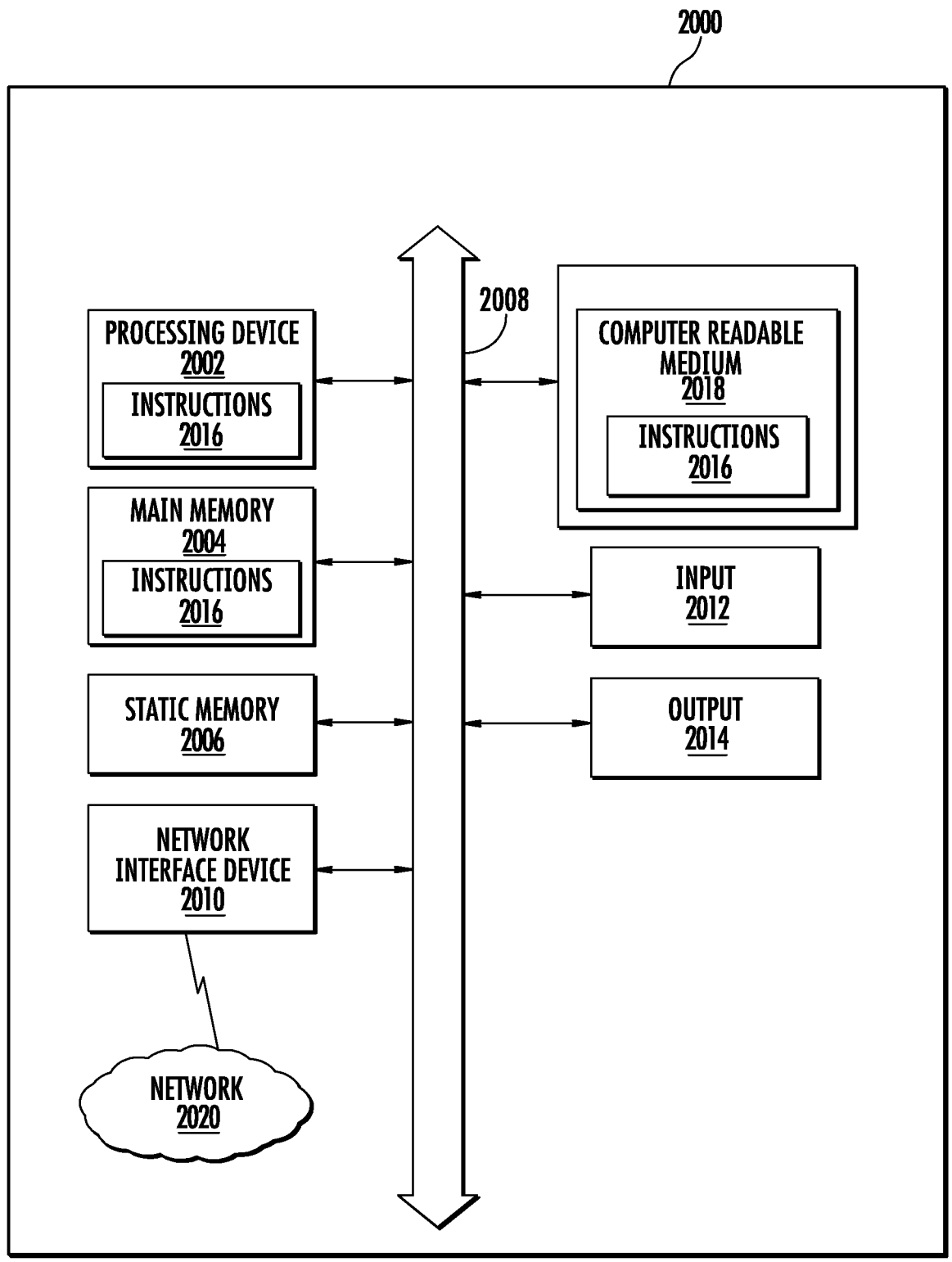
FIG. 20 is a schematic diagram of a generalized representation of an exemplary controller that can be included in any component or circuit in a power distribution system, including the power distribution systems in FIGS. 1-4, wherein an exemplary computer system is adapted to execute instructions from an exemplary computer readable link.

In the interests of completeness, one exemplary DCS having a power distribution network is explored below with reference to FIGS. 15-19 and an exemplary computer that may be used at various locations within a power distribution network is illustrated in FIG. 20. It should be appreciated that the precise context for the power distribution network is not central to the present disclosure.

Figure 15:
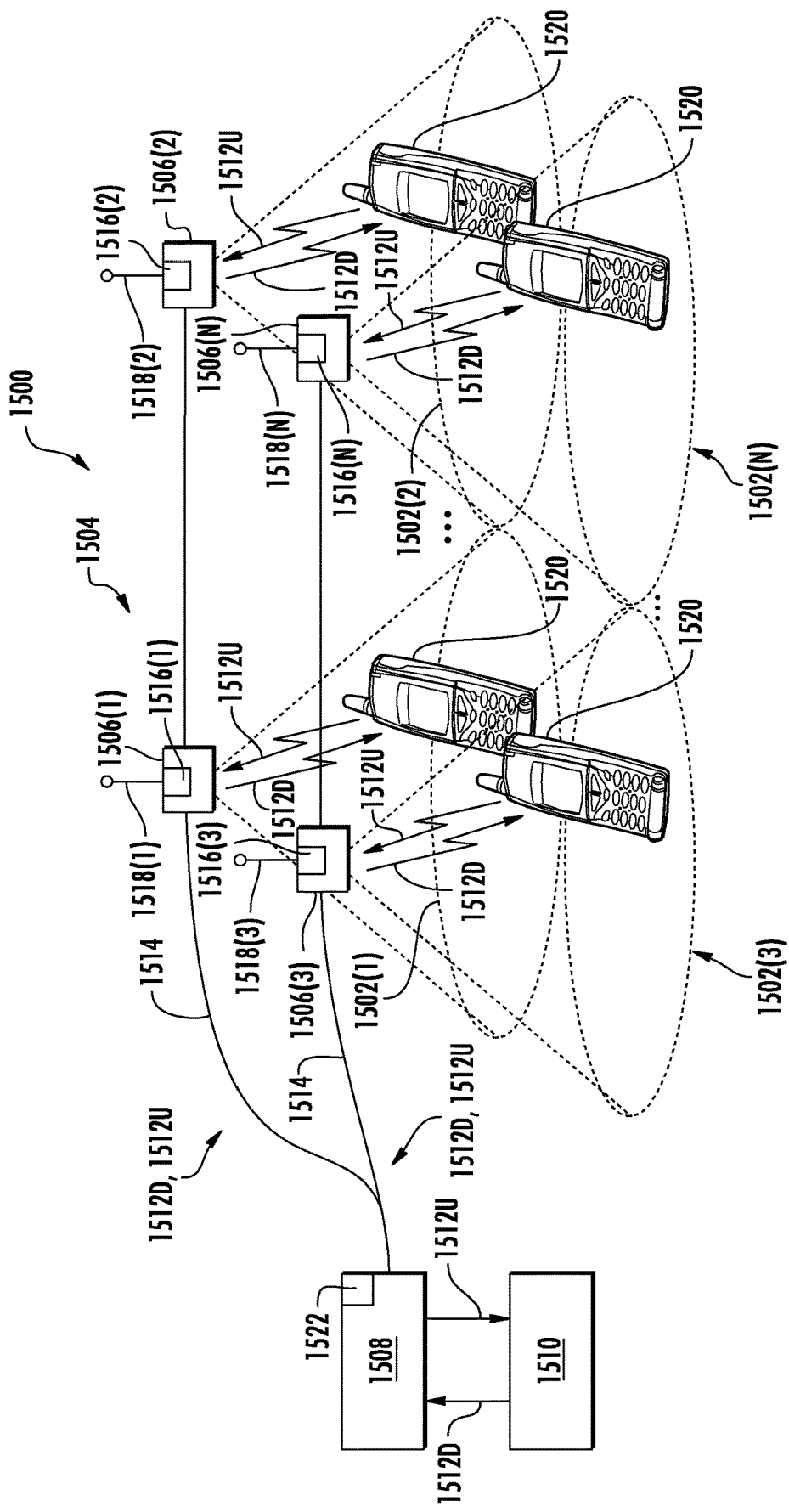
FIG. 15 is a schematic diagram of an exemplary wireless distributed communication system (DCS) in the form of a distributed antenna system (DAS) that may have a power distribution network providing power from a central unit to remote antenna units

In this regard, FIG. 15 illustrates a wireless distributed communication system (WDCS) 1500 that is configured to distribute communications services to remote coverage areas 1502(1)-1502(N), where 'N' is the number of remote coverage areas. The WDCS 1500 in FIG. 15 is provided in the form of a distributed antenna system (DAS) 1504. The DAS 1504 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 1502(1)-1502(N) are created by and centered on remote units 1506(1)-1506(N) connected to a central unit 1508 (e.g., a head-end controller, a central unit, or a head-end unit). The central unit 1508 may be communicatively coupled to a source transceiver 1510, such as for example, a base transceiver station (BTS) or a baseband unit (BBU). In this regard, the central unit 1508 receives downlink communications signals 1512D from the source transceiver 1510 to be distributed to the remote units 1506(1)-1506(N). The downlink communications signals 1512D can include data communications signals and/or communication signaling signals, as examples. The central unit 1508 is configured with filtering circuits and/or other signal processing circuits that are configured to support a specific number of communications services in a particular frequency bandwidth (i.e., frequency communications bands). The downlink communications signals 1512D are communicated by the central unit 1508 over a communications link 1514 over their frequency to the remote units 1506(1)-1506(N).

With continuing reference to FIG. 15, the remote units 1506(1)-1506(N) are configured to receive the downlink communications signals 1512D from the central unit 1508 over the communications link 1514. The downlink communications signals 1512D are configured to be distributed to the respective remote coverage areas 1502(1)-1502(N) of the remote units 1506(1)-1506(N). The remote units 1506(1)-1506(N) are also configured with filters and other signal processing circuits that are configured to support all or a subset of the specific communications services (i.e., frequency communications bands) supported by the central unit 1508. In a non-limiting example, the communications link 1514 may be a wired communications link, a wireless communications link, or an optical fiber-based communications link. Each of the remote units 1506(1)-1506(N) may include an RF transmitter/receiver 1516(1)-1516(N) and a respective antenna 1518(1)-1518(N) operably connected to the RF transmitter/receiver 1516(1)-1516(N) to wirelessly distribute the communications services to user equipment (UE) 1520 within the respective remote coverage areas 1502(1)-1502(N). The remote units 1506(1)-1506(N) are also configured to receive uplink communications signals 1512U from the UE 1520 in the respective remote coverage areas 1502(1)-1502(N) to be distributed to the source transceiver 1510.

Because the remote units 1506(1)-1506(N) include components that require power to operate, such as the RF transmitter/receivers 1516(1)-1516(N) for example, it is necessary to provide power to the remote units 1506(1)-1506(N). In one example, each remote unit 1506(1)-1506(N)

may receive power from a local power source. In another example, the remote units 1506(1)-1506(N) may be powered remotely from a remote power source(s). For example, the central unit 1508 may include a power source 1522 that is configured to remotely supply power over the communications links 1514 to the remote units 1506(1)-1506(N). For example, the communications links 1514 may be cables that include electrical conductors for carrying current (e.g., direct current (DC)) to the remote units 1506(1)-1506(N). If the WDCS 1500 is an optical fiber-based WDCS in which the communications links 1514 include optical fibers, the communications links 1514 may be a "hybrid" cable that includes optical fibers for carrying the downlink and uplink communications signals 1512D, 1512U and separate electrical conductors for carrying current to the remote units 1506(1)-1506(N).

Figure 16:
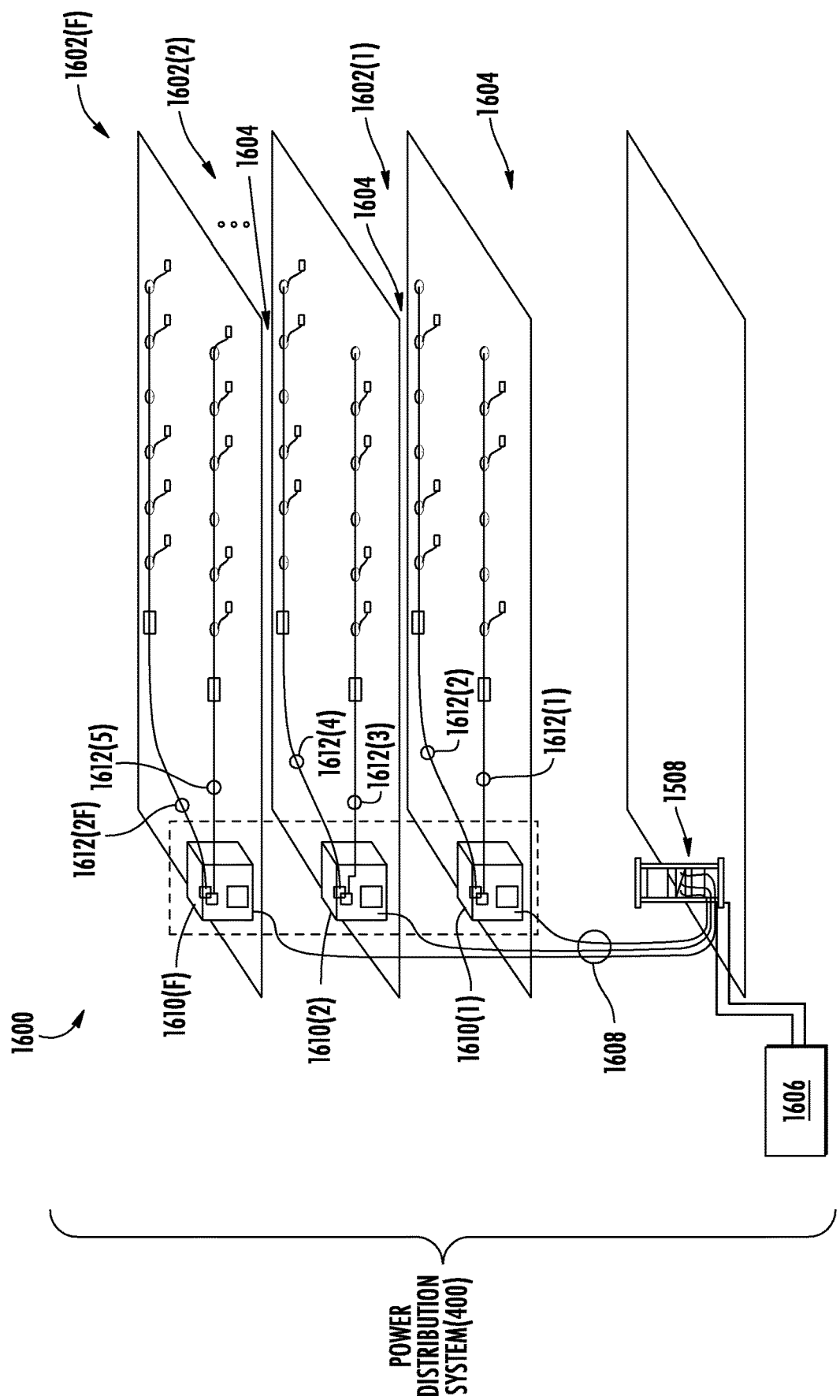
FIG. 16 is a partially schematic cut-away diagram of an exemplary building infrastructure in which the DCS in FIG. 15 can be provided.

The DAS 1500 and its power distribution system 400 can be provided in an indoor environment as illustrated in FIG. 16. FIG. 16 is a partially schematic cut-away diagram of a building infrastructure 1600 employing the power distribution system 400. The building infrastructure 1600 in this embodiment includes a first (ground) floor 1602(1), a second floor 1602(2), and an Fth floor 1602(F), where 'F' can represent any number of floors. The floors 1602(1)-1602(F) are serviced by the central unit 1508 to provide antenna coverage areas 1604 in the building infrastructure 1600. The central unit 1508 is communicatively coupled to a signal source 1606, such as a BTS or BBU, to receive the downlink electrical communications signals. The central unit 1508 is communicatively coupled to the remote subunits to receive uplink optical communications signals from the remote subunits. The downlink and uplink optical communications signals are distributed between the central unit 1508 and the remote subunits over a riser cable 1608 in this example. The riser cable 1608 may be routed through interconnect units (ICUs) 1610(1)-1610(F) dedicated to each floor 1602(1)-1602(F) for routing the downlink and uplink optical communications signals to the remote subunits. The ICUs 1610(1)-1610(F) may also include respective power distribution circuits that include power sources as part of the power distribution system 400, wherein the power distribution circuits are configured to distribute power remotely to the remote subunits to provide power for operating the power-consuming components in the remote subunits. For example, array cables 1612(1)-1612(2F) may be provided and coupled between the ICUs 1610(1)-1610(F) that contain both optical fibers to provide the respective downlink and uplink optical fiber communications media and power conductors (e.g., electrical wire) to carry current from the respective power distribution circuits to the remote subunits.

Figure 17:
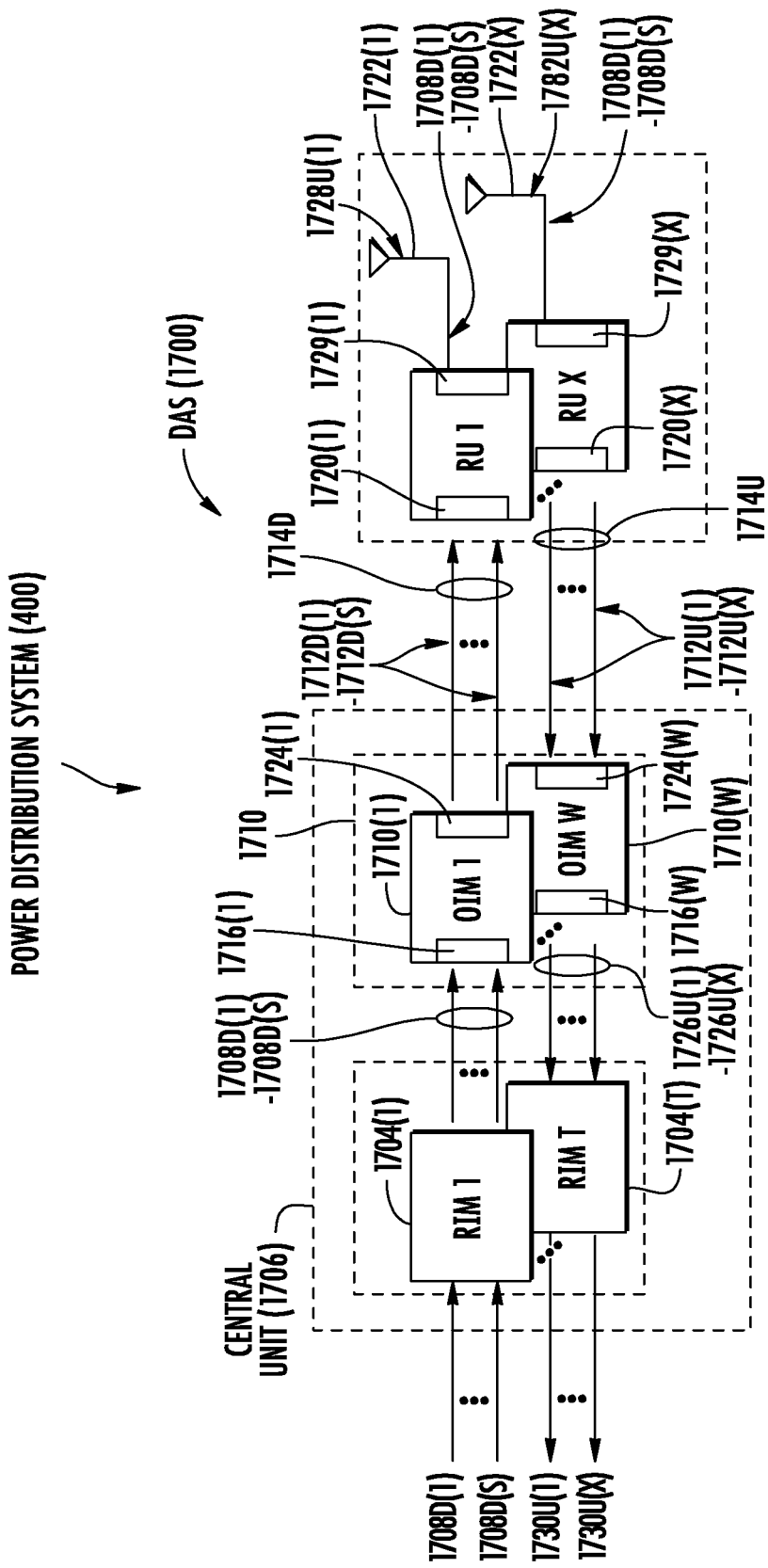
FIG. 17 is a schematic diagram of an exemplary optical-fiber based DCS configured to distribute communications signals between a central unit and a plurality of remote units, and that can include one or more power distribution systems, including the power distribution systems in FIGS. 1 and 4.

FIG. 17 is a schematic diagram of an exemplary optical fiber-based DAS 1700 in which a power distribution system can be provided. In this example, the power distribution system 400 is provided in a DCS which is the DAS 1700 in this example. Note that the power distribution system 400 is not limited to being provided in a DCS. A DAS is a system that is configured to distribute communications signals, including wireless communications signals, from a central unit to a plurality of remote subunits over physical communications media, to then be distributed from the remote subunits wirelessly to client devices in wireless communication range of a remote subunit. The DAS 1700 in this example is an optical fiber-based DAS that is comprised of three (3) main components. One or more radio interface circuits provided in the form of radio interface modules (RIMs) 1704(1)-1704(T) are provided in a central unit 1706 to receive and process downlink electrical communications signals 1708D(1)-1708D(S) prior to optical conversion into downlink optical communications signals. The downlink electrical communications signals 1708D(1)-1708D(S) may be received from a base transceiver station (BTS) or baseband unit (BBU) as examples. The downlink electrical communications signals 1708D(1)-1708D(S) may be analog signals or digital signals that can be sampled and processed as digital information. The RIMs 1704(1)-1704(T) provide both downlink and uplink interfaces for signal processing. The notations "1-S" and "1-T" indicate that any number of the referenced component, 1-S and 1-T, respectively, may be provided.

With continuing reference to FIG. 17, the central unit 1706 is configured to accept the plurality of RIMs 1704(1)-1704(T) as modular components that can easily be installed and removed or replaced in a chassis. In one embodiment, the central unit 1706 is configured to support up to twelve (12) RIMs 1704(1)-1704(12). Each RIM 1704(1)-1704(T) can be designed to support a particular type of radio source or range of radio sources (i.e., frequencies) to provide flexibility in configuring the central unit 1706 and the DAS 1700 to support the desired radio sources. For example, one RIM 1704(1)-1704(T) may be configured to support the Personal Communication Services (PCS) radio band. Another RIM 1704(1)-1704(T) may be configured to support the 700 MHz radio band. In this example, by inclusion of these RIMs 1704(1)-1704(T), the central unit 1706 could be configured to support and distribute communications signals, including those for the communications services and communications bands described above as examples.

The RIMs 1704(1)-1704(T) may be provided in the central unit 1706 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 17, the received downlink electrical communications signals 1708D(1)-1708D(S) are provided to a plurality of optical interfaces provided in the form of optical interface modules (OIMs) 1710(1)-1710(W) in this embodiment to convert the downlink electrical communications signals 1708D(1)-1708D(S) into downlink optical communications signals 1712D(1)-1712D(S). The notation "1-W" indicates that any number of the referenced component 1-W may be provided. The OIMs 1710(1)-1710(W) may include one or more optical interface components (OICs) that contain electrical-to-optical (E-O) converters 1716(1)-1716(W) to convert the received downlink electrical communications signals 1708D(1)-1708D(S) into the downlink optical communications signals 1712D(1)-1712D(S). The OIMs 1710(1)-1710(W) support the radio bands that can be provided by the RIMS 1704(1)-1704(T), including the examples previously described above. The downlink optical communications signals 1712D(1)-1712D(S) are communicated over a downlink optical fiber communications link 1714D to a plurality of remote subunits (e.g., remote subunits 404) provided in the form of remote subunits in this example. The notation "1-X" indicates that any number of the referenced component 1-X may be provided. One or more of the downlink optical communications signals 1712D(1)-1712D(S) can be distributed to each remote subunit. Thus, the distribution of the downlink optical communications signals 1712D(1)-1712D(S) from the central unit 1706 to the remote subunits is in a point-to-multipoint configuration in this example.

With continuing reference to FIG. 17, the remote subunits include optical-to-electrical (O-E) converters 1720(1)-1720(X) configured to convert the one or more received downlink optical communications signals 1712D(1)-1712D(S) back into the downlink electrical communications signals 1708D(1)-1708D(S) to be wirelessly radiated through antennas 1722(1)-1722(X) in the remote subunits to user equipment (not shown) in the reception range of the antennas 1722(1)-1722(X). The OIMs 1710(1)-1710(W) may also include O-E converters 1724(1)-1724(W) to convert received uplink optical communications signals 1712U(1)-1712U(X) from the remote subunits into uplink electrical communications signals 1726U(1)-1726U(X) as will be described in more detail below.

With continuing reference to FIG. 17, the remote subunits are also configured to receive uplink electrical communications signals 1728U(1)-1728U(X) received by the respective antennas 1722(1)-1722(X) from client devices in wireless communication range of the remote subunits. The uplink electrical communications signals 1728U(1)-1728U(X) may be analog signals or digital signals that can be sampled and processed as digital information. The remote subunits include E-O converters 1729(1)-1729(X) to convert the received uplink electrical communications signals 1728U(1)-1728U(X) into uplink optical communications signals 1712U(1)-1712U(X). The remote subunits distribute the uplink optical communications signals 1712U(1)-1712U(X) over an uplink optical fiber communications link 1714U to the OIMs 1710(1)-1710(W) in the central unit 1706. The O-E converters 1724(1)-1724(W) convert the received uplink optical communications signals 1712U(1)-1712U(X) into uplink electrical communications signals 1730U(1)-1730U(X), which are processed by the RIMs 1704(1)-1704(T) and provided as the uplink electrical communications signals 1730U(1)-1730U(X) to a source transceiver such as a BTS or BBU.

Note that the downlink optical fiber communications link 1714D and the uplink optical fiber communications link 1714U coupled between the central unit 1706 and the remote subunits may be a common optical fiber communications link, wherein for example, wave division multiplexing (WDM) may be employed to carry the downlink optical communications signals 1712D(1)-1712D(S) and the uplink optical communications signals 1712U(1)-1712U(X) on the same optical fiber communications link. Alternatively, the downlink optical fiber communications link 1714D and the uplink optical fiber communications link 1714U coupled between the central unit 1706 and the remote subunits may be single, separate optical fiber communications links, wherein for example, wave division multiplexing (WDM) may be employed to carry the downlink optical communications signals 1712D(1)-1712D(S) on one common downlink optical fiber and the uplink optical communications signals 1712U(1)-1712U(X) on a separate, only uplink optical fiber. Alternatively, the downlink optical fiber communications link 1714D and the uplink optical fiber communications link 1714U coupled between the central unit 1706 and the remote subunits may be separate optical fibers dedicated to and providing a separate communications link between the central unit 1706 and each remote subunit.

Figure 18:
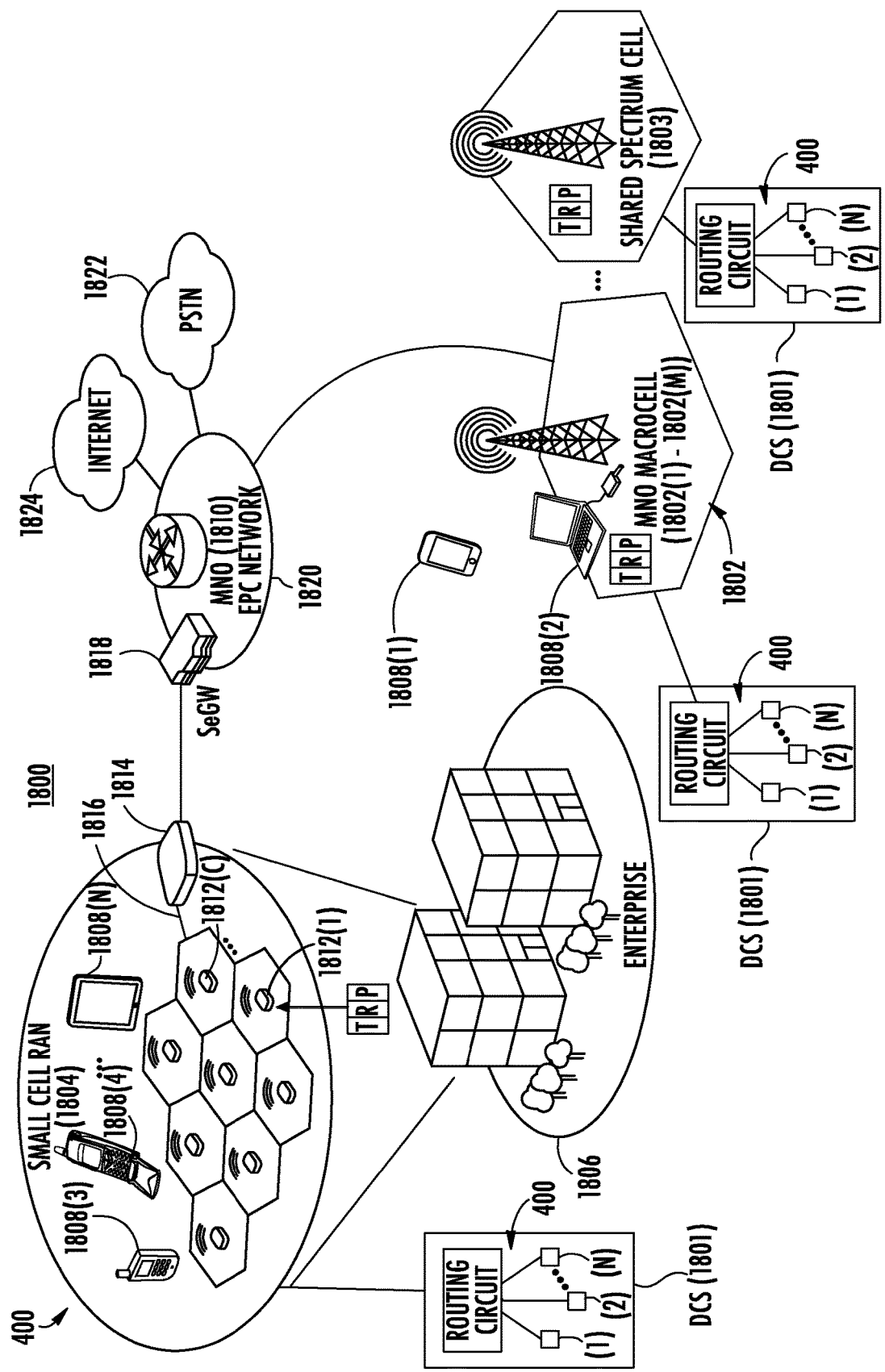
FIG. 18 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more power distribution systems, including the power distribution systems in FIGS. 1 and 4.

FIG. 18 is a schematic diagram of an exemplary mobile telecommunications environment 1800 that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more power distribution systems, including the power distribution system 400. The environment 1800 includes exemplary macrocell RANs 1802(1)-1802(M) ("macrocells 1802(1)-1802(M)") and an exemplary small cell RAN 1804 located within an enterprise environment 1806 and configured to service mobile communications between a user mobile communications device 1808(1)-1808(N) to an MNO 1810. A serving RAN for a user mobile communications device 1808(1)-1808(N) is a RAN or cell in the RAN in which the user mobile communications devices 1808(1)-1808(N) have an established communications session with the exchange of mobile communications signals for mobile communications. Thus, a serving RAN may also be referred to herein as a serving cell. For example, the user mobile communications devices 1808(3)-1808(N) in FIG. 18 are being serviced by the small cell RAN 1804, whereas user mobile communications devices 1808(1) and 1808(2) are being serviced by the macrocell 1802. The macrocell 1802 is an MNO macrocell in this example. However, a shared spectrum RAN 1803 (also referred to as "shared spectrum cell 1803") includes a macrocell in this example and supports communications on frequencies that are not solely licensed to a particular MNO and thus may service user mobile communications devices 1808(1)-1808(N) independent of a particular MNO. For example, the shared spectrum cell 1803 may be operated by a third party that is not an MNO and wherein the shared spectrum cell 1803 supports Citizen Broadband Radio Service (CBRS). Also, as shown in FIG. 18, the MNO macrocell 1802, the shared spectrum cell 1803, and/or the small cell RAN 1804 can interface with a shared spectrum DCS 1801 supporting coordination of distribution of shared spectrum from multiple service providers to remote subunits to be distributed to subscriber devices. The MNO macrocell 1802, the shared spectrum cell 1803, and the small cell RAN 1804 may be neighboring radio access systems to each other, meaning that some or all can be in proximity to each other such that a user mobile communications device 1808(1)-1808(N) may be able to be in communications range of two or more of the MNO macrocell 1802, the shared spectrum cell 1803, and the small cell RAN 1804 depending on the location of user mobile communications devices 1808(1)-1808(N).

In FIG. 18, the mobile telecommunications environment 1800 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1800 includes the enterprise environment 1806 in which the small cell RAN 1804 is implemented. The small cell RAN 1804 includes a plurality of small cell radio nodes 1812(1)-1812(C). Each small cell radio node 1812(1)-1812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 18, the small cell RAN 1804 includes one or more services nodes (represented as a single services node 1814) that manage and control the small cell radio nodes 1812(1)-1812(C). In alternative implementations, the management and control functionality may be incorporated into a radio node, distributed among nodes, or implemented remotely (i.e., using infrastructure external to the small cell RAN 1804). The small cell radio nodes 1812(1)-1812(C) are coupled to the services node 1814 over a direct or local area network (LAN) connection 1816 as an example, typically using secure IPsec tunnels. The small cell radio nodes 1812(1)-1812(C) can include multi-operator radio nodes. The services node 1814 aggregates voice and data traffic from the small cell radio nodes 1812(1)-1812(C) and provides connectivity over an IPsec tunnel to a security gateway (SeGW) 1818 in a network 1820 (e.g., evolved packet core (EPC) network in a 4G network, or 5G Core in a 5G network) of the MNO 1810. The network 1820 is typically configured to communicate with a public switched telephone network (PSTN) 1822 to carry circuit-switched traffic, as well as for communicating with an external packet-switched network such as the Internet 1824.

The environment 1800 also generally includes a node (e.g., eNodeB or gNodeB) base station, or "macrocell" 1802. The radio coverage area of the macrocell 1802 is typically much larger than that of a small cell where the extent of coverage often depends on the base station configuration and surrounding geography. Thus, a given user mobile communications device 1808(1)-1808(N) may achieve connectivity to the network 1820 (e.g., EPC network in a 4G network, or 5G Core in a 5G network) through either a macrocell 1802 or small cell radio node 1812(1)-1812(C) in the small cell RAN 1804 in the environment 1800.

FIG. 19 is a schematic diagram illustrating exemplary DCSs 1900 that support 4G and 5G communications services. The DCSs 1900 in FIG. 19 can include one or more power distribution systems, including the power distribution system 400 in FIG. 4, configured to perform a line capacitance discharge of power conductors between a power source and a remote unit(s) when a safety disconnect of the power source is performed in response to a measured current from the connected power source when the remote unit is decoupled from the power source. The DCSs 1900 support both legacy 4G LTE, 4G/5G non-standalone (NSA), and 5G communications systems. As shown in FIG. 19, a centralized services node 1902 is provided that is configured to interface with a core network to exchange communications data and distribute the communications data as radio signals to remote subunits. In this example, the centralized services node 1902 is configured to support distributed communications services to a millimeter wave (mmW) radio node 1904. The functions of the centralized services node 1902 can be virtualized through an x2 interface 1906 to another services node 1908. The centralized services node 1902 can also include one or more internal radio nodes that are configured to be interfaced with a distribution node 1910 to distribute communications signals for the radio nodes to an open RAN (O-RAN) remote unit 1912 that is configured to be communicatively coupled through an O-RAN interface 1914.

The centralized services node 1902 can also be interfaced through an x2 interface 1916 to a BBU 1918 that can provide a digital signal source to the centralized services node 1902. The BBU 1918 is configured to provide a signal source to the centralized services node 1902 to provide radio source signals 1920 to the O-RAN remote unit 1912 as well as to a distributed router unit (DRU) 1922 as part of a digital DAS. The DRU 1922 is configured to split and distribute the radio source signals 1920 to different types of remote subunits, including a lower-power remote unit (LPR) 1924, a radio antenna unit (dRAU) 1926, a mid-power remote unit (dMRU) 1928, and a high-power remote unit (dHRU) 1930. The BBU 1918 is also configured to interface with a third party central unit 1932 and/or an analog source 1934 through a radio frequency (RF)/digital converter 1936.

FIG. 20 is a schematic diagram representation of additional detail illustrating a computer system 2000 that could be employed in any component or circuit in a power distribution system, including the power distribution system 400 in FIG. 4, configured to perform a line capacitance discharge of power conductors between a power source and a remote unit(s) when a safety disconnect of the power source is performed in response to a measured current from the connected power source when the remote unit is decoupled from the power source. In this regard, the computer system 2000 is adapted to execute instructions from an exemplary computer-readable medium to perform these and/or any of the functions or processing described herein. The computer system 2000 in FIG. 20 may include a set of instructions that may be executed to program and configure programmable digital signal processing circuits in a DCS for supporting scaling of supported communications services. The computer system 2000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 2000 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 2000 in this embodiment includes a processing device or processor 2002, a main memory 2004 (e.g., read-only memory (ROM), flash memory, dynamic random access memory (DRAM), such as synchronous DRAM (SDRAM), etc.), and a static memory 2006 (e.g., flash memory, static random access memory (SRAM), etc.), which may communicate with each other via a data bus 2008. Alternatively, the processor 2002 may be connected to the main memory 2004 and/or static memory 2006 directly or via some other connectivity means. The processor 2002 may be a controller, and the main memory 2004 or static memory 2006 may be any type of memory.

The processor 2002 represents one or more general-purpose processing devices, such as a microprocessor, central processing unit, or the like. More particularly, the processor 2002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 2002 is configured to execute processing logic in instructions for performing the operations and steps discussed herein.

The computer system 2000 may further include a network interface device 2010. The computer system 2000 also may or may not include an input 2012, configured to receive input and selections to be communicated to the computer system 2000 when executing instructions. The computer system 2000 also may or may not include an output 2014, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 2000 may or may not include a data storage device that includes instructions 2016 stored in a computer-readable medium 2018. The instructions 2016 may also reside, completely or at least partially, within the main memory 2004 and/or within the processor 2002 during execution thereof by the computer system 2000, the main memory 2004 and the processor 2002 also constituting computer-readable medium. The instructions 2016 may further be transmitted or received over a network 2020 via the network interface device 2010.

While the computer-readable medium 2018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

While exemplary aspects of the present disclosure have been discussed in the context of the remote subunit 1004 disconnecting from the power source 1002, the present disclosure is not so limited. In particular, the present disclosure may be used with systems that disconnect from the power source with appropriate changes to the data modulation. That is, data is transferred from the power source to the remote subunits by changing the PRI and data from the remote subunit to the power source is modulated by extending an interrupt time period (i.e., a switch at the remote subunit will keep the circuit open for longer). Data received at the power source will be detected by measuring the time extension of the default interrupt time period and data received at the remote subunit will be detected by measuring the time interval between PRI rising edges using current measurements.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for sending a communication signal from a power source to a remote subunit over direct current (DC) power conductors, the method comprising:
    detecting an interrupt window created by a remote subunit;
    during the interrupt window opening a switch at a power source to decouple a DC power conductor from the power source;
    keeping the switch open past an end of the interrupt window to transmit data from the power source to the remote subunit; and
    synchronizing the power source to the interrupt window created by the remote subunit.

2. The method of claim 1, further comprising synchronizing a second remote subunit to the interrupt window created by the remote subunit.

3. A method for sending a communication signal from a power source to a remote subunit over direct current (DC) power conductors, the method comprising:
    detecting an interrupt window created by a remote subunit;
    during the interrupt window opening a switch at a power source to decouple a DC power conductor from the power source; and
    keeping the switch open past an end of the interrupt window to transmit data from the power source to the remote subunit,
    wherein detecting the interrupt window comprises detecting reduced current flow on the DC power conductor caused by the remote subunit disconnecting a load within the remote subunit from the DC power conductor.

4. A method for sending a communication signal from a remote subunit to a power source in a power distribution network, the method comprising:
    at a remote subunit in a power distribution network, opening a switch to disconnect a load from a power conductor to form an interrupt window according to a pulse repetition interval (PRI); and
    sending data to a power source by modulating a period of the PRI.

5. The method of claim 4, wherein modulating the PRI comprises shortening the PRI.

6. The method of claim 4, further comprising synchronizing the power source to the interrupt window generated by the remote subunit.

7. The method of claim 4, further comprising synchronizing multiple remote subunits to the interrupt window generated by the remote subunit.

8. The method of claim 4, wherein the remote subunit comprises a remote antenna unit (RAU).

9. The method of claim 4, wherein the remote subunit comprises a radio access node (RAN).

10. The method of claim 4, further comprising receiving data from the power source.

11. The method of claim 10, wherein receiving the data from the power source comprises detecting a change to a rising edge of the interrupt window.

12. A remote subunit comprising:
    a load;
    an input port configured to be coupled to a power conductor;
    a switch positioned between the load and the input port; and
    a control circuit configured to:
        open the switch to disconnect the load from the power conductor to form an interrupt window according to a pulse repetition interval (PRI); and
        send data to a power source by pulse width modulating (PWM) a period of the PRI.

13. A distributed communication system (DCS), comprising:
    a central unit configured to:
        distribute received one or more downlink communications signals over one or more downlink communications links to one or more remote subunits; and
        distribute received one or more uplink communications signals from the one or more remote subunits from one or more uplink communications links to one or more source communications outputs;

a plurality of remote subunits, each remote subunit among the plurality of remote subunits comprising:
  a power input port configured to be coupled to a power conductor and receive a power signal from a power source therefrom;
  a switch coupled to the power input port;
  a first power output port configured to be coupled to a second power conductor to provide power from the remote subunit to a second cascaded remote subunit; and
  a controller circuit configured to:
    use a current sensor to detect an interrupt window on the power conductor created by the remote subunit; and
    during the interrupt window, open the switch to decouple the power conductor from the power supply;
  the remote subunit configured to:
    distribute the received one or more downlink communications signals received from the one or more downlink communications links to one or more client devices; and
    distribute the received one or more uplink communications signals from the one or more client devices to the one or more uplink communications links; and
a power distribution system comprising:
  one or more power distribution circuits each comprising:
    a distribution power input configured to receive current distributed by the power source;
    a distribution power output configured to distribute the received current over a power conductor coupled to an assigned remote subunit among the plurality of remote subunits;
    a distribution switch circuit coupled between the distribution power input and the distribution power output, the distribution switch circuit comprising a distribution switch control input; and
    a current measurement circuit coupled to the distribution power output and comprising a current measurement output;
      the current measurement circuit configured to measure a current at the distribution power output and generate a current measurement on the current measurement output based on the measured current at the distribution power output; and
    a controller circuit comprising:
      one or more current measurement inputs communicatively coupled to the one or more current measurement outputs of the one or more current measurement circuits of the one or more power distribution circuits;
      the controller circuit configured to, for a power distribution circuit among the one or more power distribution circuits:
        generate a distribution power connection control signal indicating a distribution power connection mode to the distribution switch control input of the power distribution circuit indicating a distribution power connect state;
        determine if the measured current on a current measurement input among the one or more current measurement inputs of the power distribution circuit exceeds a predefined threshold current level; and
        in response to the measured current of the power distribution circuit exceeding the predefined threshold current level:
          communicate the distribution power connection control signal comprising the distribution power connection mode to the distribution switch control input of the power distribution circuit indicating a distribution power disconnect state.

14. The DCS of claim 13, comprising a distributed antenna system (DAS).

15. The DCS of claim 13, wherein:
the one or more downlink communications links comprise one or more optical downlink communications links;
the one or more uplink communications links comprise one or more optical uplink communications links; and
the central unit further comprises:
  one or more electrical-to-optical (E-O) converters configured to convert received one or more electrical downlink communications signals into one or more optical downlink communications signals; and
  one or more optical-to-electrical (O-E) converters configured to convert received one or more optical uplink communications signals into one or more electrical uplink communications signals;
the central unit is further configured to:
  distribute the one or more optical downlink communications signals from the one or more E-O converters over a plurality of optical distribution communications outputs to the one or more optical downlink communications links; and
  distribute the received one or more optical uplink communications signals from the one or more optical uplink communications links on a plurality of optical distribution communications inputs to the one or more O-E converters;
wherein each remote subunit among the plurality of remote subunits further comprises:
  one or more O-E converters configured to convert the received one or more optical downlink communications signals into one or more electrical downlink communications signals;
  one or more E-O converters configured to convert the received one or more electrical uplink communications signals into one or more optical uplink communications signals; and
each remote subunit among the plurality of remote subunits is configured to:
  distribute the one or more electrical downlink communications signals from the one or more O-E converters to the one or more client devices; and
  distribute the one or more optical uplink communications signals from the one or more E-O converters to the one or more optical downlink communications links.

16. The DCS of claim 13, comprising a small cell system.

17. The DCS of claim 13, wherein the remote subunit comprises a remote unit.

* * * * *